(12) United States Patent
Zhang

(10) Patent No.: US 10,394,787 B2
(45) Date of Patent: Aug. 27, 2019

(54) INDEXING METHODS AND SYSTEMS FOR SPATIAL DATA OBJECTS

(71) Applicants: HUBEI UNIVERSITY OF EDUCATION, Wuhan (CN); Rui Zhang, Parkville, Victoria (AU)

(72) Inventor: Rui Zhang, Parkville (AU)

(73) Assignees: HUBEI UNIVERSITY OF EDUCATION, Hubei (CN); Rui Zhang, Victoria (AU)

( * ) Notice: Subject to any disclaimer, the term of this patent is extended or adjusted under 35 U.S.C. 154(b) by 453 days.

(21) Appl. No.: 15/065,710

(22) Filed: Mar. 9, 2016

(65) Prior Publication Data
US 2016/0203173 A1     Jul. 14, 2016

Related U.S. Application Data

(63) Continuation of application No. PCT/CN2015/075798, filed on Apr. 2, 2015.

(30) Foreign Application Priority Data

May 30, 2014  (AU) ............................... 2014902064

(51) Int. Cl.
| | | |
|---|---|---|
| G06F 17/30 | (2006.01) | |
| G06F 16/22 | (2019.01) | |
| G06F 16/28 | (2019.01) | |
| G06F 16/29 | (2019.01) | |
| G06F 16/901 | (2019.01) | |

(52) U.S. Cl.
CPC ........ *G06F 16/2272* (2019.01); *G06F 16/289* (2019.01); *G06F 16/29* (2019.01); *G06F 16/901* (2019.01)

(58) Field of Classification Search
CPC ......... G06F 17/30336; G06F 17/30598; G06F 17/30705; G06F 17/30707
See application file for complete search history.

(56) References Cited

U.S. PATENT DOCUMENTS 5,963,956 A * 10/1999 Smartt ................ G06F 16/2264
6,470,287 B1 * 10/2002 Smartt ................ G06F 16/2264
                                                       702/102

(Continued)

FOREIGN PATENT DOCUMENTS

| CN | 101593220 A | 12/2009 |
| CN | 103714145 A | 4/2014 |

OTHER PUBLICATIONS

International Search Report of corresponding International PCT Application No. PCT/CN2015/075795, dated Jun. 25, 2015.

*Primary Examiner* — Daniel A Kuddus
(74) *Attorney, Agent, or Firm* — J.C. Patents

(57) ABSTRACT

The present application provides indexing methods and systems for indexing spatial data objects of a data space, and methods and systems for performing an operation on an index of spatial data. One of the methods includes: associating each spatial data object with one of a plurality of separations according to a size of the respective spatial data object; and mapping each spatial data object to an index key based on the separation with which the spatial data object is associated. The methods and systems for performing an operation on an index of spatial data can facilitate efficient selection or manipulation of the spatial data objects.

15 Claims, 27 Drawing Sheets

(56) References Cited

U.S. PATENT DOCUMENTS

| | | | | |
|---|---|---|---|---|
| 6,959,304 B1* | 10/2005 | Teig | .................... | G06F 17/5081 |
| | | | | 707/713 |
| 7,426,752 B2* | 9/2008 | Agrawal | ................ | G06F 21/60 |
| | | | | 726/26 |
| 7,822,776 B2* | 10/2010 | Martin | ................. | G06F 16/283 |
| | | | | 707/796 |
| 8,214,371 B1* | 7/2012 | Ramesh | ................. | G06F 16/29 |
| | | | | 707/743 |
| 2001/0014181 A1* | 8/2001 | Craver | ................... | G06F 17/30 |
| | | | | 382/276 |
| 2003/0004938 A1* | 1/2003 | Lawder | ............... | G06F 16/2264 |
| 2003/0187867 A1* | 10/2003 | Smartt | ............... | G06F 16/2264 |
| 2004/0225638 A1* | 11/2004 | Geiselhart | ............... | G06F 16/30 |
| 2005/0147240 A1* | 7/2005 | Agrawal | ................ | G06F 21/60 |
| | | | | 380/28 |
| 2006/0184519 A1* | 8/2006 | Smartt | ............... | G06F 16/2264 |
| 2007/0156634 A1* | 7/2007 | Martin | ................. | G06F 16/283 |
| 2007/0225638 A1* | 9/2007 | Stewart | ................. | A61J 17/006 |
| | | | | 604/77 |
| 2010/0114905 A1* | 5/2010 | Slavik | .................... | G06F 16/29 |
| | | | | 707/743 |
| 2015/0046411 A1* | 2/2015 | Kazmaier | ......... | G06F 17/30336 |
| | | | | 707/693 |
| 2015/0230173 A1* | 8/2015 | Li | ..................... | H04W 52/0212 |
| | | | | 370/311 |
| 2015/0370857 A1* | 12/2015 | Nica | ................. | G06F 17/30539 |
| | | | | 707/752 |
| 2016/0203173 A1* | 7/2016 | Zhang | .............. | G06F 17/30336 |
| | | | | 707/743 |

* cited by examiner

INDEXING METHODS AND SYSTEMS FOR SPATIAL DATA OBJECTS

CROSS-REFERENCE TO RELATED APPLICATION

This application is a continuation of International Application No. PCT/CN2015/075795, filed on Apr. 2, 2015, which claims priority to Australian Patent Application No. 2014902064, filed on May 30, 2014, both of which are incorporated herein by reference in their entireties.

TECHNICAL FIELD

The present invention relates to an indexing method and system for indexing spatial data objects, and a method and system for performing an operation on an index of spatial data.

BACKGROUND

In modern computing, spatial data objects are commonly used in applications or systems to represent real life objects or abstract elements. Examples of such applications or systems include Computer Aided Design (CAD) software programs, medical imaging systems and geo-mapping systems. In many instances, the spatial data objects are stored in computer databases and indices are used to facilitate efficient selection or manipulation of the spatial data objects. There is need for alternative indexing methods or systems.

SUMMARY

In order to facilitate efficient selection or manipulation of the spatial data objects, indexing methods and systems for indexing spatial data objects, and methods and systems for performing an operation on an index of spatial data are provided by the present invention. In a first aspect, the invention is an indexing method for indexing spatial data objects of a data space, including:
associating each spatial data object with one of a plurality of separations according to a size of the respective spatial data object; and
mapping each spatial data object to an index key based on the separation with which the spatial data object is associated.

By associating spatial data objects with a plurality of separations, operations may be performed on a separation by separation basis; for example, performing in effect multiple window queries on separate separations instead of a single window query covering all spatial data objects in a data space. In many cases, it is more efficient performing operations on a separation by separation basis for large data spaces including many spatial data objects of varying sizes.

In an embodiment, the indexing method further includes:
obtaining at least one spatial data object; and storing at least one index key;

In an embodiment, the size of each spatial data object is the maximum extent of the respective spatial data object.

In an embodiment, the indexing method further includes:
determining a cumulative distribution of spatial data object sizes; and
separating the cumulative distribution into a plurality of separations.

In an embodiment, determining a cumulative distribution of spatial data object sizes includes:
sampling spatial data objects of the data space;
determining a size of each sampled spatial data object; and
determining a cumulative distribution of the sampled spatial data object sizes.

In an embodiment, separating the cumulative distribution into a plurality of separations includes:
computing a cost model for sets of plurality of separations; and
selecting one of the plurality of separation sets based on the cost model.

In an embodiment, the indexing method further includes:
mapping a position of each spatial data object to one of a uniformly distributed plurality of mapped positions, and
where each spatial data object is mapped to an index key based on the separation with which the spatial data object is associated and the mapped position of the spatial data object.

In an embodiment, the position of each spatial data object is the center position of the spatial data object.

In an embodiment, the indexing method further includes:
sampling spatial data objects of the data space;
determining a position of each sampled spatial data object;
determining a cumulative distribution of the sampled spatial data object positions; and
determining a cumulative mapping function based on the cumulative distribution of the sampled spatial data object positions for mapping spatial data object positions to uniformly distributed mapped positions.

In an embodiment, each spatial data object is a N-dimensional data object, where N is an integer greater or equal to 2.

In a second aspect, the invention is an indexing system for indexing spatial data objects of a data space, including:
a separation associating module for associating each spatial data object with one of a plurality of separations according to a size of the respective spatial data object; and
an object mapping module for mapping each spatial data object to an index key based on the separation with which the spatial data object is associated.

In an embodiment, the indexing system further includes:
a data obtaining module for obtaining at least one spatial data object from a data storage; and
an index storing module for storing at least one index key in an index storage.

In an embodiment, the size of each spatial data object is the maximum extent of the respective spatial data object.

In an embodiment, the indexing system further includes:
a data size distribution module for determining a cumulative distribution of spatial data object sizes; and
a data separating module for separating the cumulative distribution into a plurality of separations.

In an embodiment, the data size distribution module includes:
a data size sampling sub-module for sampling spatial data objects;
a data size sub-module for determining a size of each sampled spatial data object; and
a data size distribution sub-module for determining a cumulative distribution of the sampled spatial data object sizes.

In an embodiment, the data separating module includes:
a cost computing sub-module for computing a cost model for sets of plurality of separations; and
a separations selecting sub-module for selecting one of the plurality of separation sets based on computations by the cost computing module.

In an embodiment, the indexing system further includes:
a data position mapping module for mapping a position of each spatial data object to one of a uniformly distributed plurality of mapped positions, and
where the object mapping module is adapted to map each spatial data object to the respective index key based on the separation with which the spatial data object is associated and the mapped position of the spatial data object.

In an embodiment, the position of each spatial data object is the center position of the respective spatial data object.

In an embodiment, the indexing system further includes:
a data position sampling sub-module for sampling spatial data objects;
a data position processing sub-module for determining a position of each sampled spatial data object;
a data position distribution sub-module for determining a cumulative distribution of the sampled spatial data object positions; and
a data position mapping function sub-module for determining a cumulative mapping function for mapping spatial data object positions to uniformly distributed mapped positions based on the cumulative distribution of the sampled spatial data object positions.

In an embodiment, each spatial data object is a N-dimensional data object, where N is an integer greater or equal to 2.

In an embodiment, the indexing system further includes:
a tree storage for storing tree keys; and
an indexing module for indexing index keys as entries of a tree.

In an embodiment, the tree keys are arranged as a B+ tree.

In a third aspect, the invention is a method of performing an operation on an index f spatial data objects associated with a plurality of separations, including:
receiving a query for spatial data objects;
determining adjusted queries to be performed for spatial data objects associated with each separation based on a size characteristic of the respective separation and the received query; and
performing an adjusted query for each separation.

In an embodiment, the size characteristic of each separation is the maximum size of a spatial data object in the respective separation.

In an embodiment, the operation is a window query for spatial data objects.

In an embodiment, the query is a window query for spatial data objects.

In an embodiment, the window of the query is a window which is rectangular.

In an embodiment, determining adjusted queries to be performed for spatial data objects associated with each separation based on a size characteristic of the respective separation and the received query includes forming a window query having a rectangular window.

In an embodiment, the rectangular window of an adjusted query is formed by extending the rectangular window of the received query.

In an embodiment, an extension is equivalent to half the maximum size of a spatial data object associated with the respective separation.

In an embodiment, determining adjusted queries to be performed for spatial data objects associated with each separation based on a size characteristic of the respective separation and the received query further includes mapping at least one position of the rectangular window of the adjusted query to at least one of a uniformly distributed plurality of mapped positions.

In an embodiment, each corner position of the rectangular window of an adjusted query is mapped to a mapped position.

In an embodiment, performing an adjusted query for each separation includes determining a list of index key ranges including index keys representing spatial data objects that may intersect the window of the adjusted query.

In an embodiment, the list of index keys is determined by adding index keys of a region of the separation to the list of index keys.

In an embodiment, index keys of the region are added to the list of index keys if the window of the adjusted query covers the region.

In an embodiment, the list of index keys is determined by sub-dividing a region into a plurality of sub-regions; and
adding index keys of each sub-region that the window of the adjusted query covers.

In an embodiment, the list of index keys is determined by adding index key pairs, the first key of an index key pair representing an entry point to the window of the adjusted query and the second key of the index key pair representing the next exit point after the entry point to the window of the adjusted query.

In an embodiment, each spatial data object is a N-dimensional data object, where N is an integer greater or equal to 2.

In a fourth aspect, the invention is an indexing system for performing an operation on an index of spatial data objects associated with a plurality of separations, including:
a query receiving module for receiving a query for spatial data objects;
a query adjusting module for determining adjusted queries to be performed for spatial data objects associated with each separation based on a size characteristic of the respective separation and the received query; and
a query processing module for performing an adjusted query for each separation.

In an embodiment, the size characteristic of each separation is the maximum size of a spatial data object in the respective separation.

In an embodiment, the operation is a window query.

In an embodiment, the query is a window query.

In an embodiment, the window of the query is a window which is rectangular.

In an embodiment, the query adjusting module includes an adjusted window forming sub-module for forming a window query having a rectangular window.

In an embodiment, the adjusted window forming sub-module forms a rectangular window of an adjusted query by extending the rectangular window of the received query.

In an embodiment, the adjusted window forming sub-module forms a rectangular window of an adjusted query by extending the rectangular window of the received query by half the maximum size of a spatial data object associated with the respective separation.

In an embodiment, the query adjusting module further includes a window position mapping sub-module for mapping at least one position of the rectangular window of an adjusted query to at least one of a uniformly distributed plurality of mapped positions.

In an embodiment, the window position mapping sub-module maps the at least one position of the rectangular window of an adjusted query to the at least one of a uniformly distributed plurality of mapped positions by mapping each corner position of the rectangular window of an adjusted query to a mapped position.

In an embodiment, the query processing module includes an index key list processing module for determining a list of index key ranges including index keys representing spatial data objects that may intersect the window of the adjusted query.

In an embodiment, the index key list processing module determines the list of index keys by adding index keys of a region of the separation to the list of index keys.

In an embodiment, the index key list processing module adds the index keys of the region if the window of the adjusted query covers the region.

In an embodiment, the query processing module further includes a sub-division processing module for sub-dividing a region into a plurality of sub-regions; and the index key list processing module determines the list of index keys by adding index keys of each sub-region that the window of the adjusted query covers.

In an embodiment, the index key list processing module determines the list of index keys by adding index key pairs, the first key of an index key pair representing an entry point to the window of the adjusted query and the second key of the index key pair representing the next exit point after the entry point to the window of the adjusted query.

In an embodiment, each spatial data object is a N-dimensional data object, where N is an integer greater or equal to 2.

In an embodiment, each spatial data object corresponds to an entry in a B+ tree.

In a fifth aspect, the invention is an indexing method for indexing spatial data objects of a data space, including:
mapping a position of each spatial data object to one of a uniformly distributed plurality of mapped positions; and
mapping a position of each spatial data object to one of a uniformly distributed plurality of mapped positions; and
mapping each spatial data object to an index key based on the position to which a position of the spatial data object is mapped.

In a sixth aspect, the invention is an indexing system for indexing spatial data objects of a data space, including:
a data position mapping module for mapping a position of each spatial data object to one of a uniformly distributed plurality of mapped positions; and
an object mapping module for mapping each spatial data object to an index key based on the mapped position of the spatial data object.

In a seventh aspect, the invention is a method of performing an operation on an index of spatial data objects of a data space, including:
receiving a query for spatial data objects;
mapping at least one position of the query to at least one of a uniformly distributed plurality of mapped positions;
performing a query based on the at least one mapped position.

In an eighth aspect, the invention is an indexing system for performing an operation on an index of spatial data objects of a data space, including:
a query receiving module for receiving a query for spatial data objects;
a window position module for mapping at least one position of the query to at least one of a uniformly distributed plurality of mapped positions;
a query processing module for performing a query based on the at least one mapped position.

In a ninth aspect, the invention is a computer program code which when executed implements any one of the above methods.

In a tenth aspect, the invention is a computer readable storage medium including the above computer program code.

BRIEF DESCRIPTION OF THE DRAWINGS

Embodiment, incorporating one or more of the aspects of the invention, will now be described by way of examples with reference to the accompanying drawings in which.

DETAILED DESCRIPTION OF THE EMBODIMENTS

The technical solutions in the embodiments of the present invention are clearly and fully described in the following with reference to the accompanying drawings in the embodiments of the present invention. Obviously, the embodiments to be described are only a part rather than all of the embodiments of the present invention. Based on the embodiments of the present invention, all other embodiments obtained by persons skilled in the art without creative efforts shall fall within the protection scope of the present invention.

In FIGS. 1 to 8, there are shown embodiments of an indexing system for indexing spatial data objects of a data space. A spatial data object is any N-dimensional data object, where N is an integer greater or equal to 2.

Persons skilled in the art would appreciate that the indexing system can be implemented or provided in a variety of ways including as software, hardware, firmware, or as a combination of these. In addition, individual components of the indexing system (such as particular modules) do not need to all be provided in the same manner. It should also be noted that the indexing system may be distributed, including by being located in a plurality of countries.

Typically, it is envisaged that software program code is executed on a computing system to implement the indexing system, the computing system comprising hardware including a processor, memory, a hard disk, a network interface etc. For example, the indexing system can be provided by installing a software program product on a computing system. In use, a processor in the computing system executes the software program installed in the hard disk, temporarily caches in the memory of the computing system the sizes of sampled spatial data objects, and obtains a spatial data object from a remotely located data storage connected via the network interface of the computing system.

Figure 1:
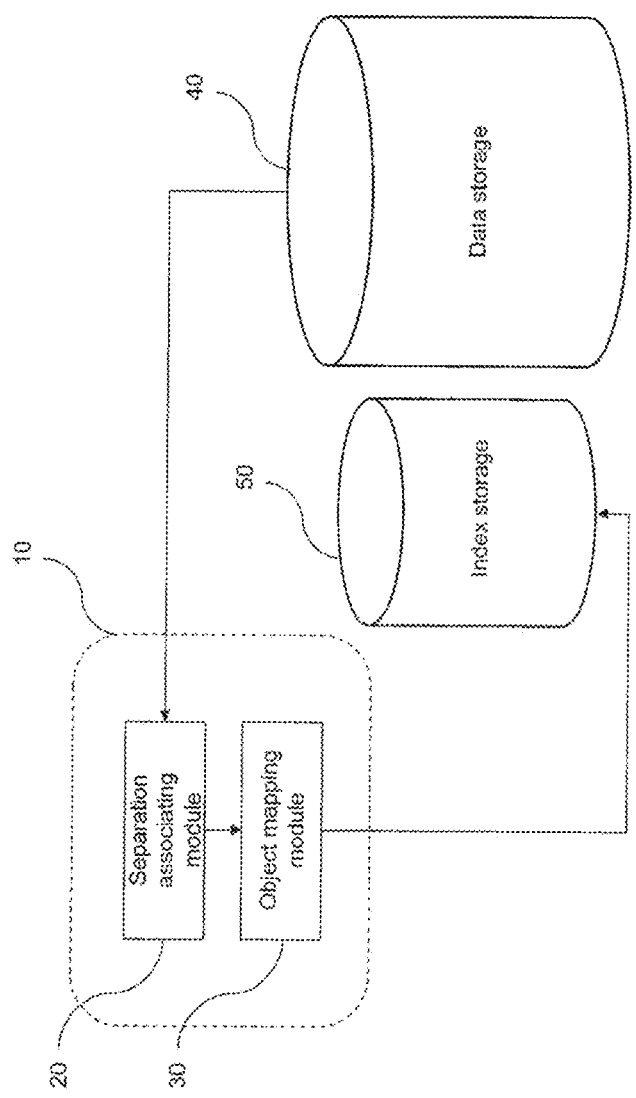
FIG. 1 is a schematic diagram illustrating an indexing system for indexing spatial data objects, together with a data storage and an index storage.

FIG. 1 is a schematic diagram illustrating functionally an indexing system according to an embodiment of the invention.

At the broadest level, the indexing system 10 comprises two primary modules: a separation associating module 20 and an object mapping module 30.

The separation associating module 20 is arranged to associate a spatial data object with one of a plurality of separations according to a size of the spatial data object. In an embodiment, a size of a spatial data object is the maximum extent of the spatial data object and the plurality of separations is a plurality of mutually exclusive groups with which one or more spatial data objects can be associated.

Specifically, let O be a set of D-dimensional spatial data objects. Given a spatial data object o∈O, the size of o is defined as the largest extent of o in all dimensions, denoted by |o|. Formally, $$|o|=\max\{o \cdot u_1 - o \cdot l_1, o \cdot u_2 - o \cdot l_2, o \cdot u_D - o \cdot u_D\} \quad (1).$$

Herein, $o \cdot u_j$ and $o \cdot l_j$ denote the upper and lower bounds of $o$ in the $j^{th}$ dimension.

A separation configuration of O, denoted by f, consists of the number of separations f·n and a vector of separation size values $f \cdot \vec{d} = \langle f \cdot d_1, \ldots, f \cdot d_n \rangle$. Where, $f \cdot d_i$ represents a separation size value, which means that any spatial data object with a size smaller than or equal to $f \cdot d_i$ belongs to the separation i. Let pn(o) be a function that returns a separation number with which a spatial data object is associated, then $$pn(o)=i, f \cdot d_{i-1} < |o| \leq f \cdot d_i \quad (2)$$

For example, spatial data objects in O are separated into three separations, i.e., f·n=3. The maximum spatial data object sizes in the three separations are 13, 28 and 55, respectively. Therefore, the size values that the objects are separated at are 13, 28 and 55, i.e., $f \cdot \vec{d} = \langle 13_1, 28, 55 \rangle$.

As illustrated in FIG. 1, the separation associating module 20 is in communication with the object mapping module 30 which is arranged to map a spatial data object to an index key based on the separation with which the spatial data object is associated. Thus, in use, the object mapping module 30 maps spatial data objects to index keys based on the respective separation associated by the separation associating module 20. In an embodiment, the object mapping module 30 maps the spatial data objects to index keys using space-filling curves (such as Z curves or Hilbert curves); the mapping being carried out using the mapping function of the particular space-filling curve that is used. Conceptually, the use of a space-filling curve can be thought of as sub-dividing the entire data space into blocks; the index keys representing the individual blocks. Typically, the index key represents how many steps the space-filling curve takes to get to that block. In such an embodiment, the center position (sometimes referred to as the "centroid") of a spatial data object is mapped to an index key according to which block of the data space the centre position lies in. In an embodiment, the blocks (or index keys) of two different separations are differentiated by "offsetting"; for example, if the last block (or index key) of the first separation is 63, then the first block (or index key) of the second separation is 64.

In the embodiment illustrated in FIG. 1, the separation associating module 20 and the object mapping module 30 are in a standalone form (that is, the modules 20, 30 are separate from the data storage 40 and the index storage 50). It is envisaged however that the indexing system may alternatively be in a form including either or both the data storage and the index storage. For separation associating module 20 and the object mapping module 30 can be implemented in a computing system connected to but located separately from the data storage and/or index storage. The system for performing an operation on an index of spatial data facilitates efficient selection or manipulation of the spatial data objects.

Figure 2:
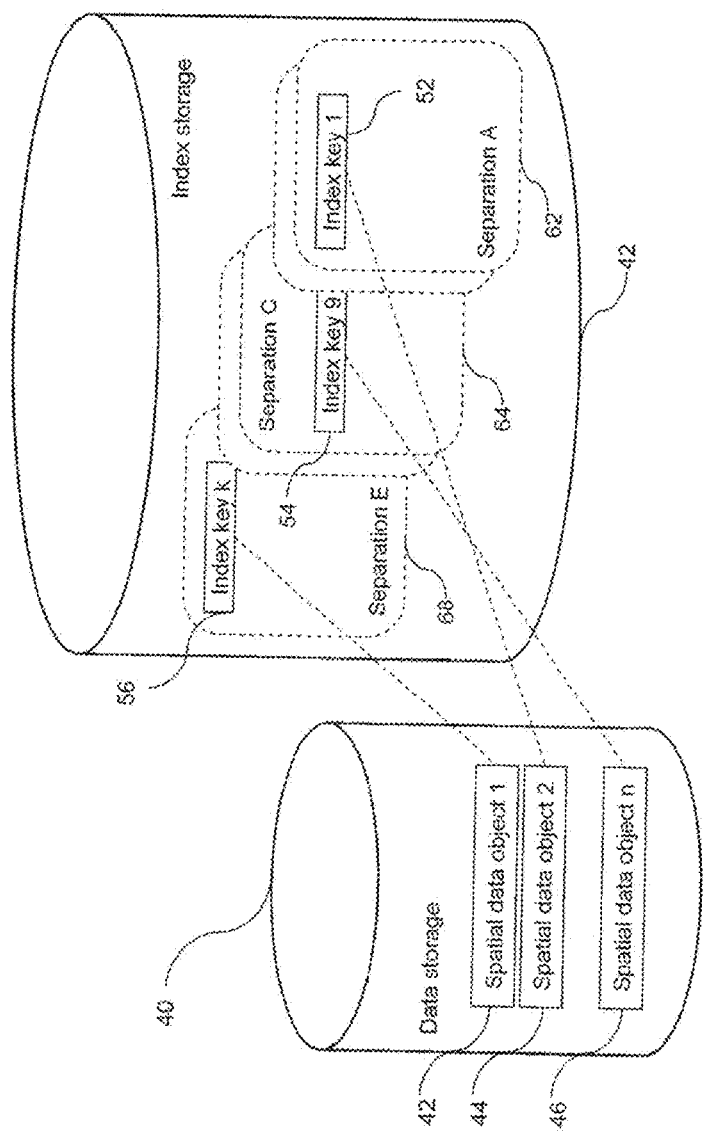
FIG. 2 is a schematic structure illustrating relationships between spatial data objects and index keys.

FIG. 2 illustrates in greater detail relationships between the spatial data objects and the index keys according to an embodiment of the present invention. In this figure, the data storage 40 comprises a plurality of spatial data objects 42, 44, 46 which are indexed as index keys by the indexing system 10. These index keys 52, 54, 56 are stored in the index storage 50 as index key 1, index key 9 and index key k. Each of these index keys 52, 54, 56 corresponds to a spatial data object in the data storage 40. In an embodiment where the spatial data objects are mapped using space filling curves, each of the index keys represents a particular block within a data space which intersects (either entirely or partially, depending on the size of the object) a spatial data object.

Each of the plurality of index keys 52, 54, 56 shown are associated with one of a plurality of separations including separation A 62, separation C 64 and separation E 68. As illustrated, each separation can be conceptualized as separate indices comprising index keys corresponding to spatial data objects of particular sizes.

By separating spatial data objects according to their sizes, certain operations can be performed on an index more efficiently on a separation by separation basis. For example, window queries can be adjusted according to the sizes of spatial data objects that can possibly exist in a particular separation.

Figure 3:
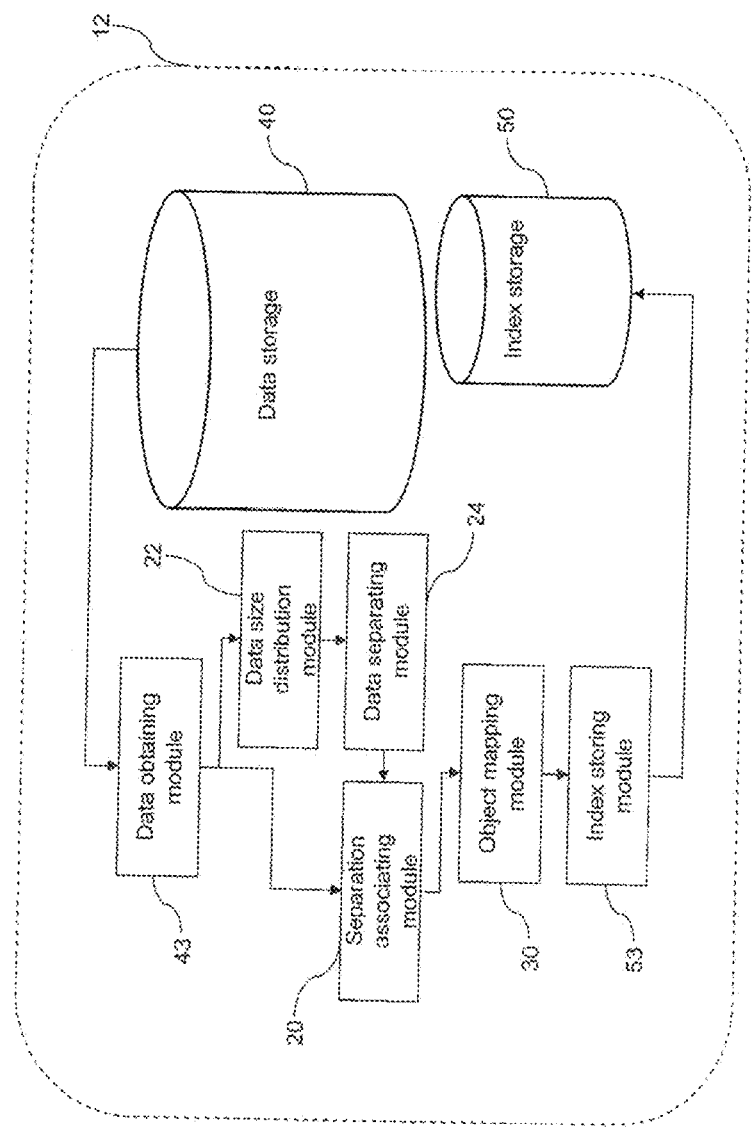
FIG. 3 is a schematic diagram illustrating another indexing system for indexing spatial data objects.

FIG. 3 is a schematic diagram illustrating another embodiment of the indexing system 12. As discussed previously, a data storage and/or an index storage can be implemented in combination as part of or separately from an indexing system. In this embodiment, the indexing system 12 includes both a data storage 40 for storing a plurality of spatial data objects and an index storage 50 for storing a plurality of index keys.

This indexing system 12 also has several additional modules to the above-mentioned separation associating module 20 and object mapping module 30.

Firstly, there are two modules for communicating with the data storage 40 and the index storage 50: a data obtaining module 43 arranged to obtain one or more spatial data objects from the data storage 40, and an index storing module 53 arranged to store one or more index keys in the index storage 50. As illustrated, the data storage 40 is in communication with the data obtaining module 43 and the index storing module 53 is in communication with the index storage 50. This allows the data obtaining module 43 to obtain spatial data objects stored in the data storage 40 and the index storing module to store index keys in the index storage 50.

Besides the two modules 43, 53, the indexing system 12 further includes a data size distribution module 22 and a data separating module 24. These modules determine a plurality of separations each having a "size characteristic". In this embodiment, the data size distribution module 22 is arranged to determine a cumulative distribution of spatial data object sizes. The cumulative distribution is a representation of the proportion of spatial data objects having a size which is less than or equivalent to a set of increasing sizes. The data separating module is arranged to separate the cumulative distribution into a plurality of separations.

Together, the data size distribution module 22 and the data separation module 24 provide an arrangement for setting up or re-configuring a plurality of separations which group spatial data objects according to whether a spatial data object is of a size less than or equal to a particular size of the separation (sometimes referred to as the maximum spatial data object size of the separation).

Persons skilled in the art will appreciate that the modules 22, 24 can be in a separate computing system from the modules 20, 30; that is, there can be a standalone system including only a data size distribution module 22 and a data separating module 24.

In FIG. 3, the indexing system 12 includes also a separation associating module 20 and an object mapping module 30. As illustrated, spatial data objects obtained from the data obtaining module 43 may be associated with a separation (directly via the separation associating module 20) and/or be used to setup or reconfigure a plurality of separations (via the data size distribution module 22 and the data separating module 24) for use by the separation associating module 20. Thus, this embodiment provides not only for setting up or re-configuring a plurality of separations for separating spatial data objects but also for indexing spatial data objects according to a size of each spatial data object. Having both functions can be beneficial; for example, a particular plurality of separations can be setup or re-configured for a set of spatial data objects that provides the best performance (for example, a set of separations can established so as to provide a fast response time when searching through index keys, or so as to minimize number of page access required).

Figure 4:
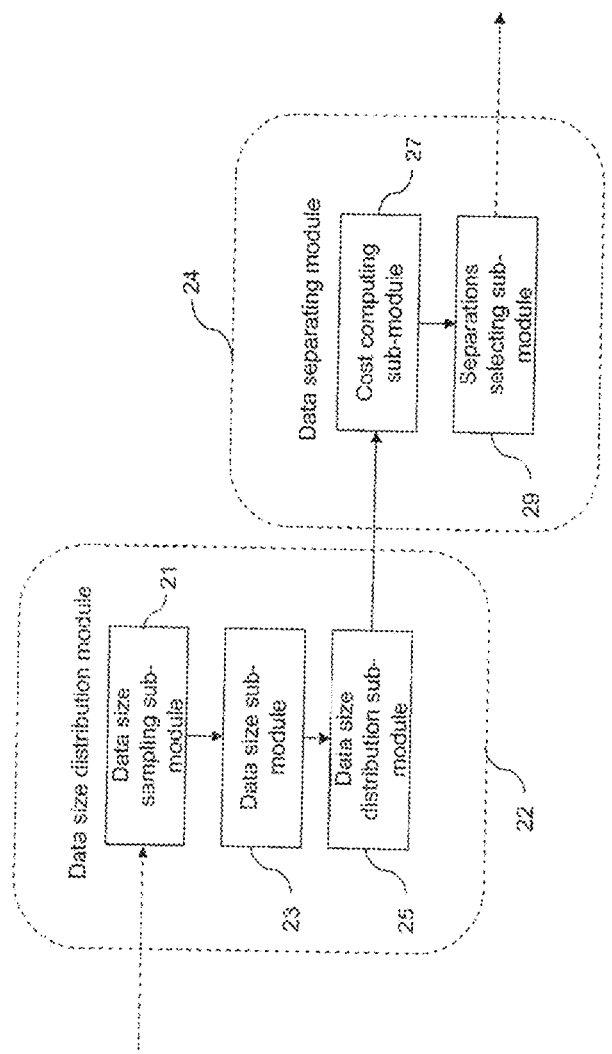
FIG. 4 is a schematic diagram illustrating in greater detail the data size distribution module and the data separation module of FIG. 3.

FIG. 4 is a schematic diagram illustrating in greater detail the data size distribution module 22 and the data separation module 24 of FIG. 3.

The data size distribution module 22 includes a data size sampling sub-module 21, a data size sub-module 23, and a data size distribution sub-module 25: The data size sampling sub-module 21 is arranged to sample spatial data objects obtained from the data obtaining module 43 of FIG. 3. (Note that the other modules in FIG. 3 are not shown in FIG. 4. However, dashed connector lines are used to illustrate that the data size sampling sub-module 21 of the data size distribution module 22 communicates with the data obtaining module 43 of FIG. 3.) Typically, the sampled objects are stored in a storage array.

The data size sub-module 23 is arranged to determine a size of the spatial data objects sampled by the data size sampling sub-module 21.

The data size distribution sub-module 25 is arranged to determine a cumulative distribution of the sizes determined by the data size sub-module 23. In an embodiment, the data size distribution sub-module 25 determines a cumulative distribution by counting, for a set of increasing spatial data object sizes, the number of spatial data objects having a size equal or less than a particular spatial data object size.

The cumulative distribution determined by the data size distribution sub-module 25 can be separated in a variety of ways to provide a plurality of separations. One way would be to separate the distribution uniformly into equal size blocks. Alternatively, a cost model may be used to evaluate different sets of separations to determine which set will provide the best computing performance to thereby select the best of those analyzed by the cost model.

Since different separation configurations may result in different query performance, finding a suitable separation configuration is very important. The use of a cost model is advantageous because it allows comparison and/or ranking of plurality of separation sets based on the results of the cost model, thereby allowing determination of suitable or an optimized plurality of separations.

In this embodiment, the data separating module 23 includes a cost computing sub-module 27 and a separations selecting sub-module 29: The cost computing sub-module 27 is arranged to compute a cost model for sets of plurality of separations based on the cumulative distribution determined by the data size distribution module. In this embodiment, a cost model can be determined specifically for the purpose of finding a set of separations for performing window queries. In an embodiment, the cost-computing sub-module may compute the cost module simply by computing in a "brute-force" manner (that is, by looping though different number of separations and different sets of separation values). Thus, for each separation set, the cost of performing certain operations can be computed and the best performing setup can be selected. The separations selecting sub-module 29 is arranged to select one of the plurality of separations based on the results of the computations by the cost computing sub-module 27. The selected plurality of separations can be communicated to the separation associating module 20 of FIG. 3.

In the following, an example of finding a suitable separation configuration by using a cost model is provided.

First, use sampling to obtain the size distribution of the objects in O. Let $S_1$ be a random sample set on O. Then, estimate the size distribution of the objects in O. If there are $n_d$ objects in $S_1$ whose sizes are less than or equal to d, then there are approximately $$n_d \times \frac{|O|}{|S_1|}$$

objects in O whose sizes are less than or equal to d, where $|O|$ and $|S_1|$ denote the cardinalities of O and $|S_1|$, respectively. Then, use a two layer loop to exhaustively search for the best separation configuration. The outer loop iterates through different numbers of separations (from 1 to $n_{max}$) while the inner for-loop iterates through different combinations of separation size values for each choice of number of separations. Here, $n_{max}$ is a predefined system parameter indicating the largest possible number of separations, while the separation size values are the sizes of the objects in $S_1$ obtained from the sampling step. In each iteration, a cost model is used to return the cost of the configuration given the number of separations and the separation size values as input. After the two layer loop, the best separation configuration is found.

As the number of separations is usually small, typically 3 or 4 for many tested data sets and settings, and the number of separation size values is not too large either, typically below 500, the separation configuration selection process described above takes only tens of seconds to complete. Since the separation configuration selection process is done only once at indexing building time, the cost is acceptable.

Let $\hat{f}$ denotes the best separation configuration found by the above algorithm. Then, separate O into $\hat{f}\cdot n$ separations, where the separation contains the objects whose sizes are less than or equal to $\hat{f}\cdot d_i$. As a result of the expansion, it is only need to check whether the centroids of the objects are in the expanded window query. This converts a problem of querying objects with non-zero extents to a problem of querying point objects.

Figure 5:
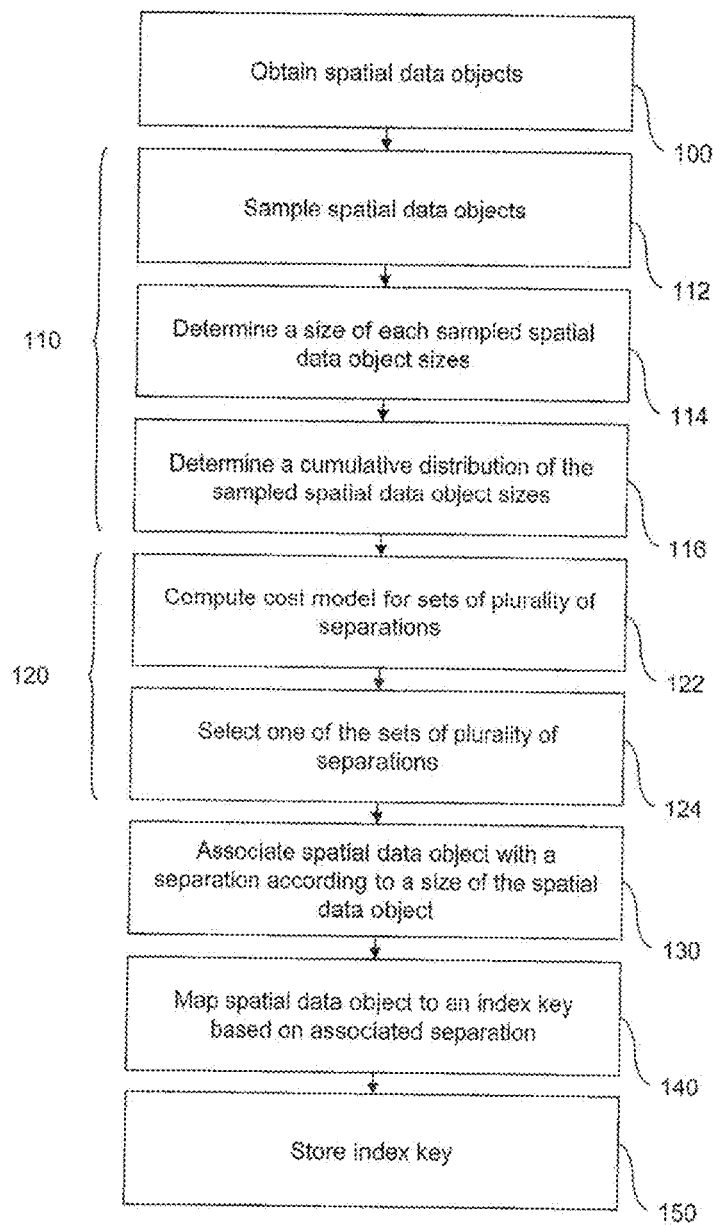
FIG. 5 is a flowchart illustrating steps for indexing spatial data objects.

FIG. 5 is a flowchart illustrating steps for indexing spatial data objects according to an embodiment including setting up a plurality of separations.

Spatial data objects are first obtained 100. As discussed previously, a cumulative distribution of spatial data object sizes 110 may be set up or established using the obtained spatial data objects. This determination involves taking a sample of the obtained spatial data objects 112, determining a size of each object in the sample 114, and determining a cumulative distribution of sizes 116. The cumulative distribution is then separated into a plurality of separations 120. To do this, a cost model is used to compute cost for each set of a plurality of sets of plurality of separations 122 and one of the sets is selected based on the results of the computations. Once a plurality of separations is determined, each spatial data objects is then associated with a separation according to a size of the respective object 120. Based on the separation an object is associated with, the object is then mapped to an index key 140. This index key is then finally stored 150 for future access.

Figure 6:
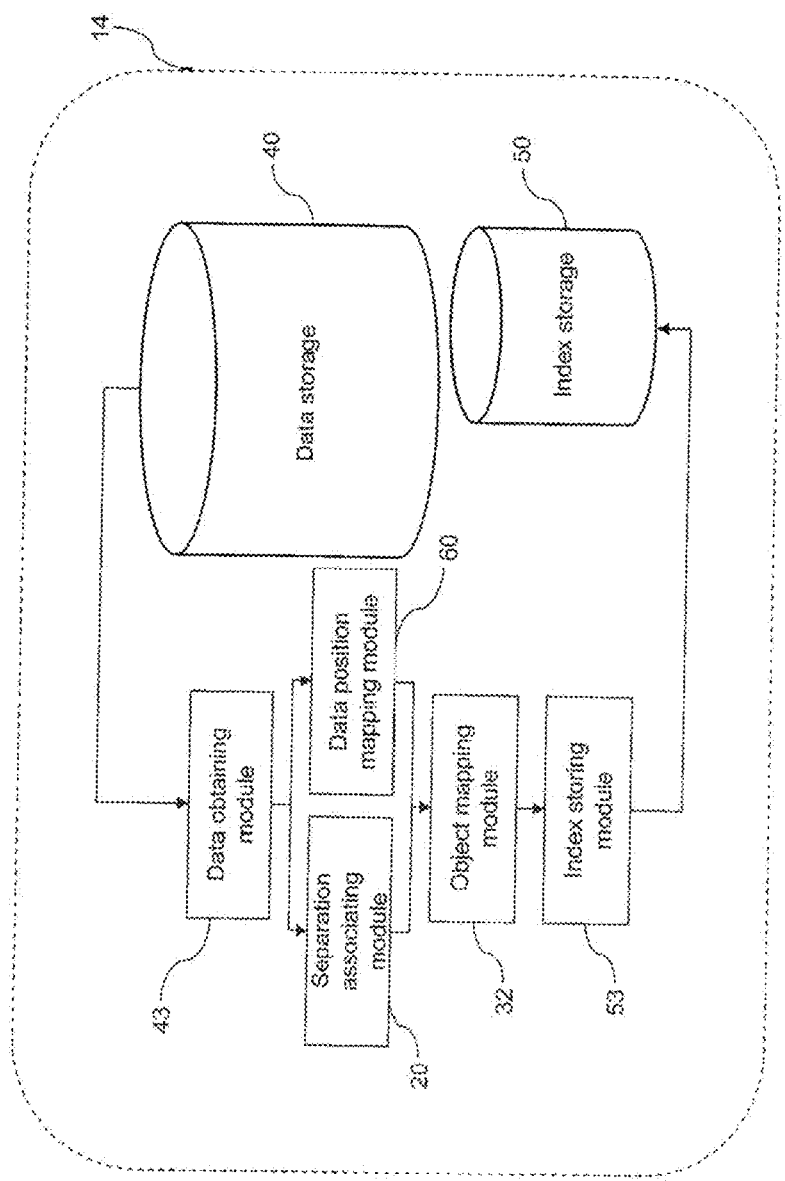
FIG. 6 is a schematic diagram illustrating another indexing system including a data position mapping module.

FIG. 6 is a schematic diagram illustrating another embodiment of the indexing system 14. The indexing system 14 includes a position mapping module 60 which is arranged to map a position of a spatial data object from the data obtaining module 43 to one of a uniformly distributed plurality of mapped positions. In this embodiment, an object mapping module 32 is adapted not only to map each spatial data object based on the separation with which the spatial data object is associated by also the mapped position of the spatial data object.

Mapping a position of a spatial data object from the data obtaining module 43 to one of a uniformly distributed plurality of mapped positions is advantageous. If the mapped positions (representing positions of spatial data objects in the data space) are divided into discrete blocks using a space-filling curve, less number of larger blocks may be required; that is, a larger number of smaller blocks may be required if the positions of spatial data objects are directly divided into discrete blocks using space-filling curves. Having less number of blocks typically means that a smaller index can be used to represent the blocks.

The data position mapping module 60 can be used in isolation with an object mapping module 32 without a separation associating module 20. In an embodiment having only the data position mapping module 60, the object mapping module 32 can be arranged to map the spatial data object to an index key based on the mapped position of the spatial data object.

Figure 17:
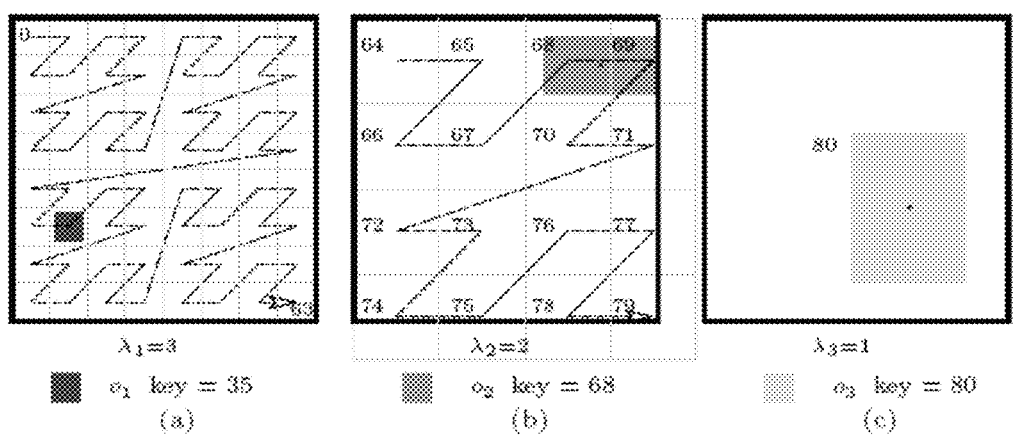
FIG. 17 is a schematic diagram of an example of indexing three spatial data objects.

FIG. 17 illustrates an example of indexing three spatial data objects including associating each object with a separation, mapping a position of each spatial data object to one of a uniformly distributed plurality of mapped positions, and mapping each spatial data object to an index key based on the separation with which the spatial data object is associated with and its mapped position. FIG. 17, object A has a maximum extent less than maximum spatial data object size (that is the "size characteristic") of the first separation so it is associated with the first separation. Object A's centroid (after being mapped using a mapping function to one of a uniformly distributed plurality of mapped positions) is at block 35 according to the space-filling curve (Z curve in this example). Thus object A is mapped as (or represented by) index key 35. Object B has a maximum extent greater than maximum spatial data object size of the first separation but less than maximum spatial data object size of the second separation so it is associated with the second separation. Object B's centroid is located in block number 4 of the second separation, but because it is in the second separation the object's index key is offset by the number of blocks in the first separation. In this example, the number of blocks to offset the $i^{th}$ separation can be computed according to the below equation.

$$o(i, d_{0 \ldots n}) = \sum_{j=1}^{i-1} 2^{D\left[\log_2 \frac{1}{d_j}\right]} \quad (3)$$

where $d_i$ is the maximum spatial data object size of separation i, D is the dimensionality of the data space (and the spatial data objects of the data space), and in represents the number of separations.

In FIG. 17, the offset for the second separation is thus 64, and object B is thus represented by the index key 68.

Note that because the number of blocks across the data space in the second separation is not a power of 2, a base 2 space-filling curve cannot fill the blocks exactly. In this second separation, there are $$2^{\left[\log_2 \frac{1}{d_j}\right]}$$

blocks along each dimension, but only the first $$\frac{1}{d_j}$$

blocks are used. This means that in this example, there are unused blocks outside the data space of the second separation. Persons skilled in the art would appreciate that in this example, having unused blocks allows simpler calculations of the space-filling curve.

Figure 7:
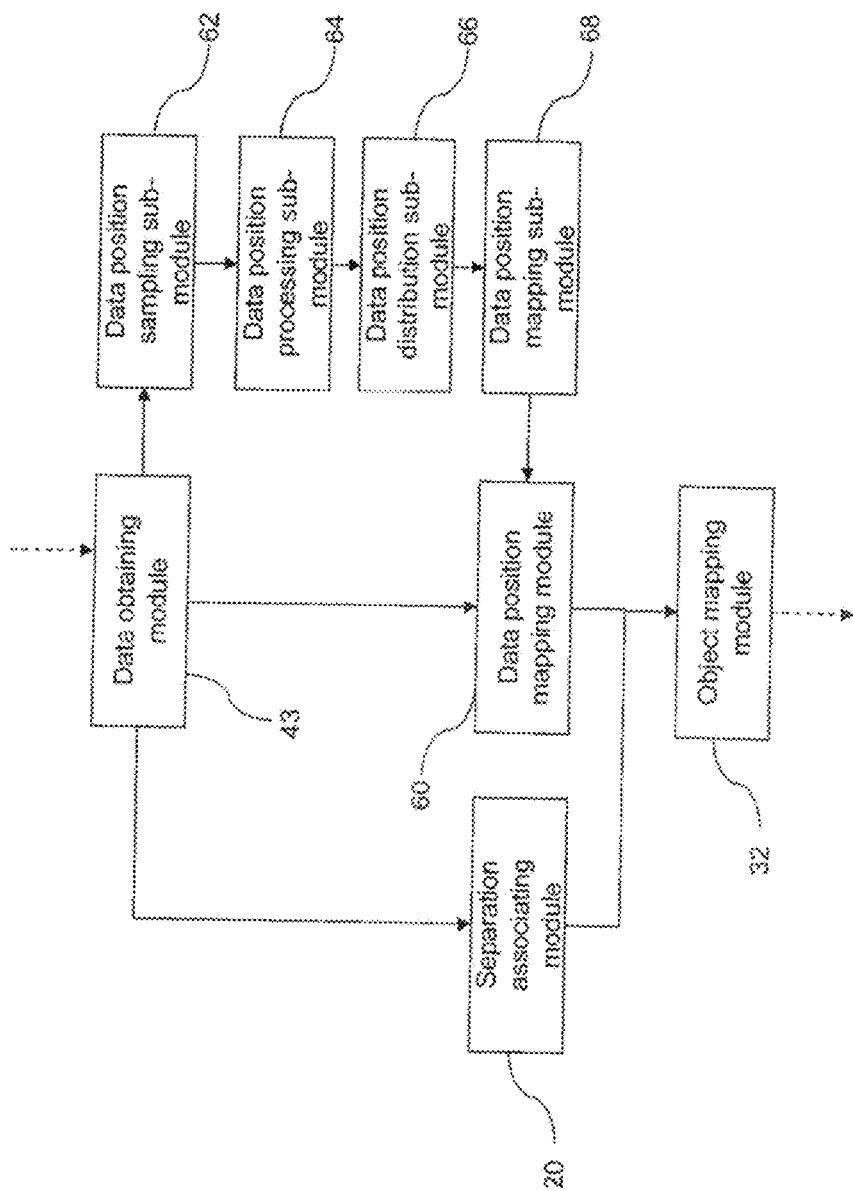
FIG. 7 is a schematic diagram illustrating another indexing system for indexing spatial data objects.

FIG. 7 is a schematic diagram of an embodiment of the indexing system 16 illustrating how the uniformly distributed plurality of mapped positions may be established. In this embodiment, the indexing system 16 comprises further a data position sampling sub-module 62, a data position processing sub-module 64, a data position distribution module 66 and a data position mapping sub-module 68.

The data position sampling sub-module 62 is arranged to sample spatial data objects obtained from the data obtaining module 43. The data position processing sub-module 64 is arranged to determine a position of the spatial data objects sampled by the data position sampling sub-module 62. In an embodiment, data position processing sub-module 64 is arranged to determine the center position of each spatial data object. These positions are then communicated to the data position distribution sub-module 66.

The data position distribution sub-module 66 is arranged to determine a cumulative distribution of the sampled spatial data object positions. Typically, the cumulative distribution is determined by computing an approximate cumulative distribution of positions along each dimension. It is envisaged that ideally an actual cumulative distribution of positions is determined instead of relying on an approximation. However, it is usually difficult (and in many cases impossible) in practice to determine an actual cumulative distribution.

To perform the mapping, the data position mapping function sub-module 68 is arranged to approximate a cumulative mapping function for mapping spatial data object positions to uniformly distributed mapped positions based on the cumulative distribution of the sampled spatial data object positions determined by the data position distribution sub-module 66. In an embodiment, the cumulative mapping function approximated by the data position mapping function sub-module 68 for mapping a position of a spatial data object position to one of a uniformly distributed plurality of mapped positions is $$t(x, i, d) = \frac{CM_d[i][x_n](1 - x_f) + CM_d[i][x_n + 1]x_f}{CM_d[i][T]} \quad (4)$$

where $$x_n = [xT] \quad (5)$$

$$x_f = xT - x_n \quad (6)$$

and x is a position of the spatial data object to be mapped, i represents the $i^{th}$ separation, d is the dimension, T is the number of divisions for centroid sampling, and $CM_{1 \ldots n}$ [1 ... n][0 ... T] represents arrays of cumulative mapping values.

Besides, the cumulative mapping function may also be:

$$cdf_{i,j}(o \cdot c) = \frac{(b_{k+1} \cdot c - b_k \cdot c)(o \cdot c_j - b_k) + b_k \cdot c(b_{k+1} - b_k)}{|S|(b_{k+1} - b_k)} \quad (7)$$

$$k = [o \cdot c_j \times n_b] \quad (8)$$

Here, o·c is a position of the spatial object to be mapped, i represents the $i^{th}$ separation, j is the dimension, $n_b$ is the number of divisions for centroid sampling, $b_{[0 \ldots n_b]} \cdot c$ represents arrays of cumulative mapping values, and |S| represents the number of sampled spatial objects.

Note that if $o \cdot c_j = 1$, then $k = n_b$ and hence $b_{k+1}$ will be undefined. In this case, the above equation is not used to compute $cdf_{i,j}$ (o·c) but directly define it to be 1.

Figure 8:
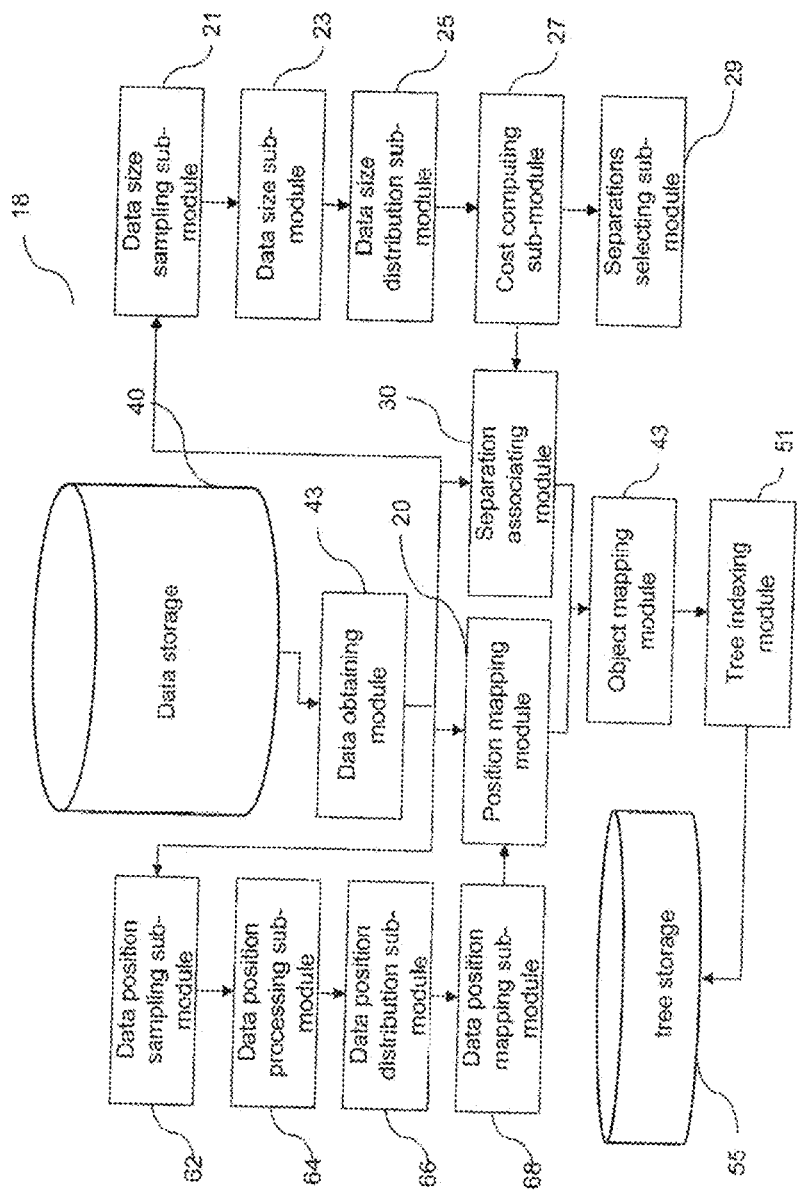
FIG. 8 is a schematic diagram illustrating another indexing system for indexing spatial data objects.

FIG. 8 is a schematic diagram illustrating another embodiment of the indexing system. In this embodiment, the indexing system 18 includes the modules for associating spatial data objects with separations 30, for setting up or reconfiguring the plurality of separations 21, 23, 25, 27, 29, for mapping positions of spatial data objects to mapped positions 20, and for determining a mapping function for mapping spatial data object positions to a uniformly distributed plurality of mapping positions 62, 64, 66, 68.

In this embodiment, the modules for setting up or reconfiguring the plurality of separations 21, 23, 25, 27, 29, and for determining a mapping function for mapping spatial data object positions to a uniformly distributed plurality of mapping positions 62, 64, 66, 68 are combined.

As discussed earlier, a cost function can be used to determine a suitable or optimized set of separations. In an embodiment, for a window width q and separation sizes $d_i$ ($d_i$ being the maximum spatial data object size of separation i), a cost function for the expected page access cost can be computed according to $$E_c(q) = \sum_{i=1}^{n} P_c\left(\frac{1}{f \times u}[N(d_i) - N(d_{i-1})](\min\{1, q + d_i\})^D + 1\right) \quad (9)$$

where $P_c$ is the clustering performance for a particular space-filling curve, f is the number of spatial data objects in a page (also sometimes referred to as "leaf node fanout"), u is the average node usage, D is the dimensionality of spatial data objects in the data space, and $N(d_i)$ is the total number of spatial data objects smaller than $d_i$.

Besides, the above equation may be replaced by the following equation:

$$E_c(q) = \sum_{i=1}^{n} P_c\left(\left[\frac{N_i(|q|+d_i)^D}{f}\right] + \frac{3}{2}\right) \quad (10)$$

Here, n is the total number of separations, $P_c$ is the clustering performance for a particular space-filling curve, N represents the number of objects in the $i^{th}$ separation, $|q|$ represents the size of the query window q, $d_i$ represents the separation size of the $i^{th}$ separation, D is the dimensionality of spatial data objects in the data space, and f is the number of spatial data objects in a page (also sometimes referred to as the "lead node fanout").

Figure 18:
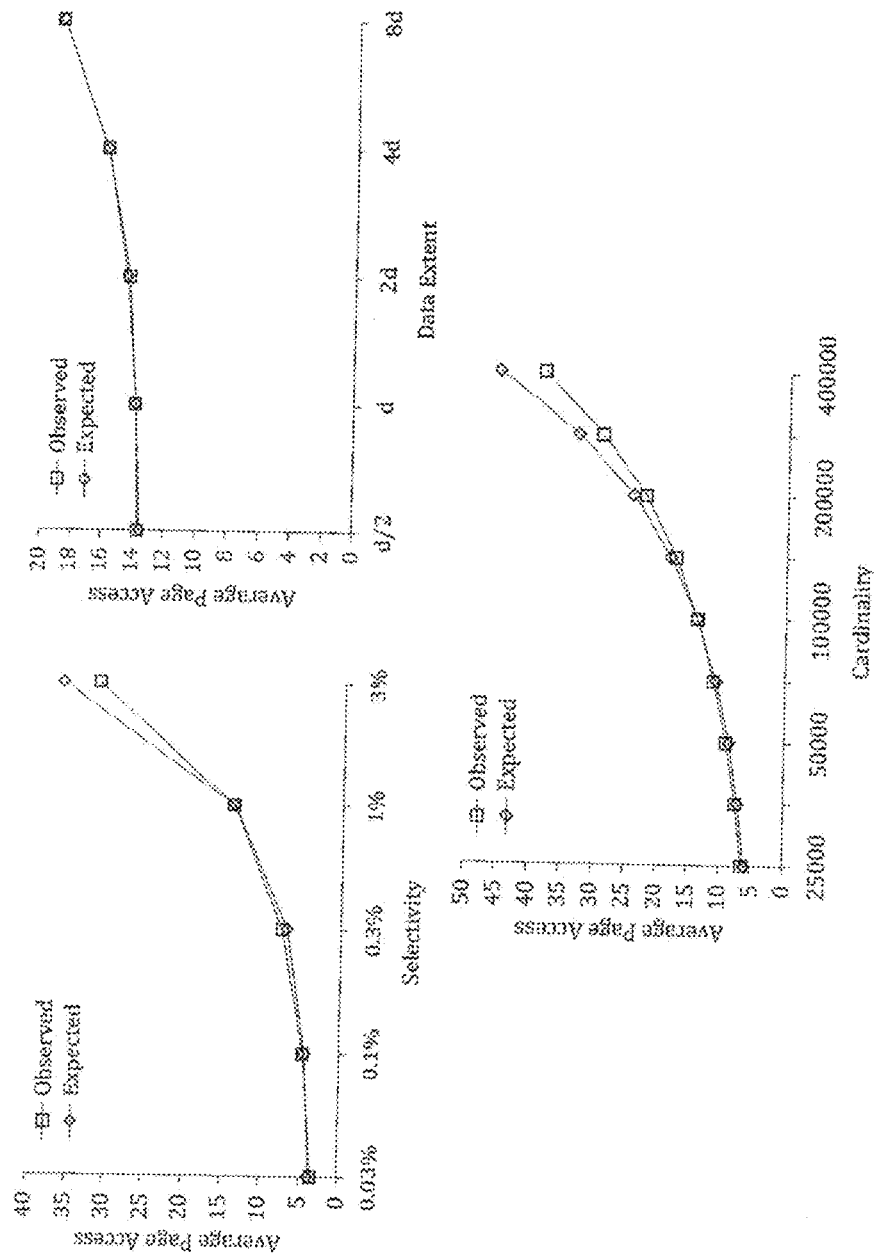
FIG. 18 illustrates three graphs showing the difference between actual and estimated page access for a range of data sets.

To calculate the above cost function, an estimate of the clustering performance for a particular space-filling curve $P_c$ can be used. In an embodiment, this estimate is obtained experimentally; that is, $P_c$ can be approximate experimentally by simulating for a plurality of data sets; the data sets being different variations of the above parameters of the above cost function to vary the data set cardinality (the number of distinct spatial data objects), window selectivity (the ratio of window query area to data space area) and object extent. A value of $P_c$ is then determined by seeking to minimize the error between the expected average page access (calculated using the above cost function) and the observed average page access from the experiments. FIG. 18 illustrate three graphs showing the difference between actual and estimated page access for a range of data set cardinalities, window selectivities and object extents.

Examples of $P_C$ (together with corresponding errors for each $p_C$) for the Hilbert and Z curves in 2 and 3 dimensions is tabulated below.

TABLE 1

Values of for $P_c$ for different space-filling curves

|  | $P_C$ | Error |
| --- | --- | --- |
| Hilbert curve, 2-dimensional | 1.6893 | 5.38% |
| Z curve, 2-dimensional | 1.9905 | 8.13% |
| Hilbert curve, 3-dimensional | 3.3407 | 6.77% |
| Z curve, 3-dimensional | 3.7538 | 7.03% |

Using the above cost function and $P_C$ values from the above table, the cost of any window having a width q (or any hyper-cube query with a side length q) can be computed for any set of separation sizes $d_i$.

Besides, the table specified above may be replaced by the following table

TABLE 2

Values of for $P_c$ for different space-filling curves

|  | $P_C$ | Error |
| --- | --- | --- |
| Hilbert curve, 2-dimensional | 1.5722 | 5.45% |
| Z curve, 2-dimensional | 1.8817 | 8.24% |

TABLE 2-continued

Values of for $P_c$ for different space-filling curves

|  | $P_C$ | Error |
| --- | --- | --- |
| Hilbert curve, 3-dimensional | 3.2014 | 6.65% |
| Z curve, 3-dimensional | 3.5883 | 7.15% |

Referring back to FIG. 8, this embodiment also includes a tree storage 51 and a tree indexing module 43 for indexing index keys from the object mapping module 51 as entries in a B+ tree. Persons skilled in the art will appreciate that the entries may not be arranged as a B+ tree but that any 1-dimensional tree is suitable. It is beneficial in many cases to map index keys as tree entries as there are already many existing systems based on a B+ tree structure. Accordingly the indexing system 18 can simply be an additional layer added on top of an existing database management system (DBMS).

Figure 9:
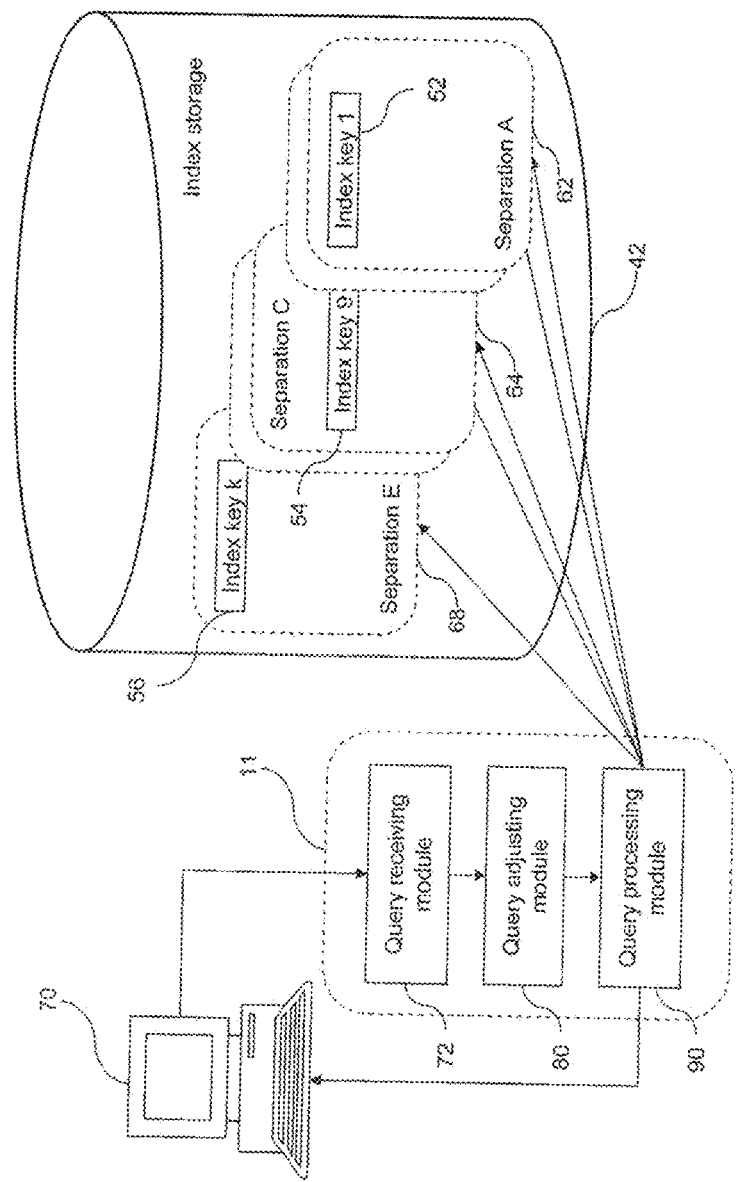
FIG. 9 is a schematic diagram illustrating an indexing system for performing an operation on an index of spatial data objects.
Figure 10:
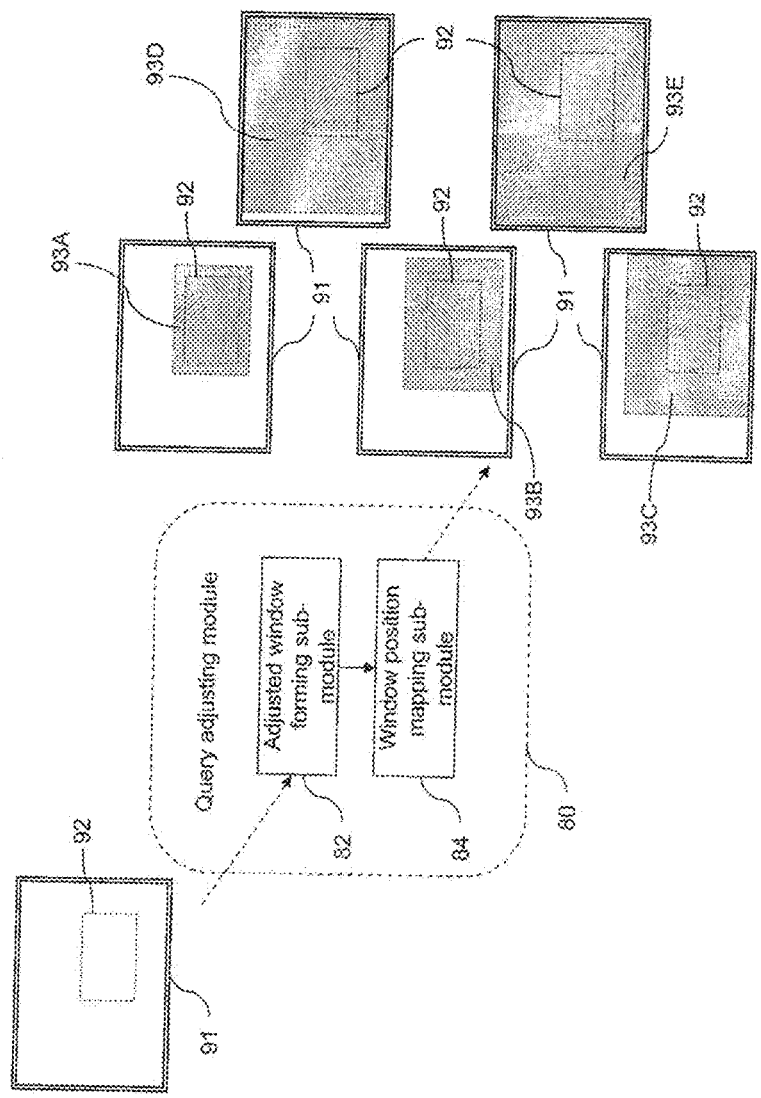
FIG. 10 is a schematic diagram illustrating the query adjusting module of FIG. 9.

In FIG. 9 and FIG. 10, there are provided schematic diagram illustrating an indexing system 11 for performing an operation on an index of spatial data objects indexed by the indexing system.

In one scenario, the operation may be a window query. Persons skilled in the art will appreciate that a window query can have a window of any shape. Typically, embodiments employ rectangular windows. However, queries having other window shapes can be used for querying 2-dimensional data objects. This is similarly the case for window queries for querying higher dimensional data objects (N-dimensional data objects, where N is greater or equal to 3); a window query for querying higher dimensional data objects may have a window having any higher-dimensional shape. Typically, it is envisaged that a typical window query has a window that is hyper-rectangular.

FIG. 9 and FIG. 10 illustrate an embodiment wherein the operation and the query are both window queries. However, it is envisaged that the operation can include other operations such as updating the index, inserting a new spatial data object into the index etc. Furthermore, it is envisaged that multiple operations can be performed on a plurality of related data spaces indexed by the indexing system. For example, a first index and a second index indexed by the indexing system can be related. For example, spatial data objects of the first index may represent restaurants in one geographic region and the spatial data objects of the second index may represent car-parking in the same geographic region so that a window query performed on the first index (for example, to locate for restaurants in a particular area) may be joined to one or more window queries performed on the second index (for example, to locate for car-parking around the restaurants located in the particular area). That is, a window query to locate restaurants can be used to generate one or more subsequent window queries to locate those restaurants which are close to car-parking.

Referring firstly to FIG. 9, the indexing system 11 comprises a query receiving module 70, a query adjusting module 80 and a query processing module 90.

The query receiving module 70 is arranged to receive a query for spatial data objects. The query adjusting module 80 is arranged to determine adjusted queries to be performed for spatial data objects associated with each separation based on a size characteristic of the respective separation and the received query. Typically, the size characteristic of each separation is the maximum size of a spatial data object in the respective separation. The query processing module 90 is arranged to perform an adjusted query for each separation.

When in use, the query receiving module 70 communicates a query to the query adjusting module 80 which in turn determines adjusted queries to be performed for spatial data objects associated with each separation based on the size characteristic of the respective separation and the received query.

The query processing module 90 then perform queries adjusted by the query adjusting module 80 for each separation. By iterating through every separation associated with an index, the indexing system thus performs queries for all spatial data objects of the index.

Referring now to FIG. 10, there is illustrated in greater detail the query adjusting module 80 of FIG. 9. The query adjusting module 80 comprises an adjusted window forming sub-module 82 and a window position mapping sub-module 84.

The adjusted window forming sub-module 82 is arranged to form a window query having a rectangular window extending the window of the received query by half the maximum size of an object in the separation in each direction along each dimension. It is envisaged that forming a window extending the window of the received query by half the maximum size of an object in the separation in each direction along each dimension captures all possible objects that may intersect the received window query.

Illustrations of adjusted window queries are included in FIG. 10. On the top left hand corner, there is shown a data space 91 and a window 92 representing the window of a received window query. On the right hand wide, there is illustrated five data spaces one for each separation. In each data space, there is illustrated an adjusted window query 93A, 93B, 93C, 93D or 93E.

The window position mapping sub-module is arranged to map least one position of the rectangular window of an adjusted query to at least one of a uniformly distributed plurality of mapped positions. In an embodiment, this is performed by mapping the window using the mapping function determined by module 62, 64, 66, 68. In an embodiment, the window position mapping sub-module 84 maps every corner position of each window.

Figure 14:
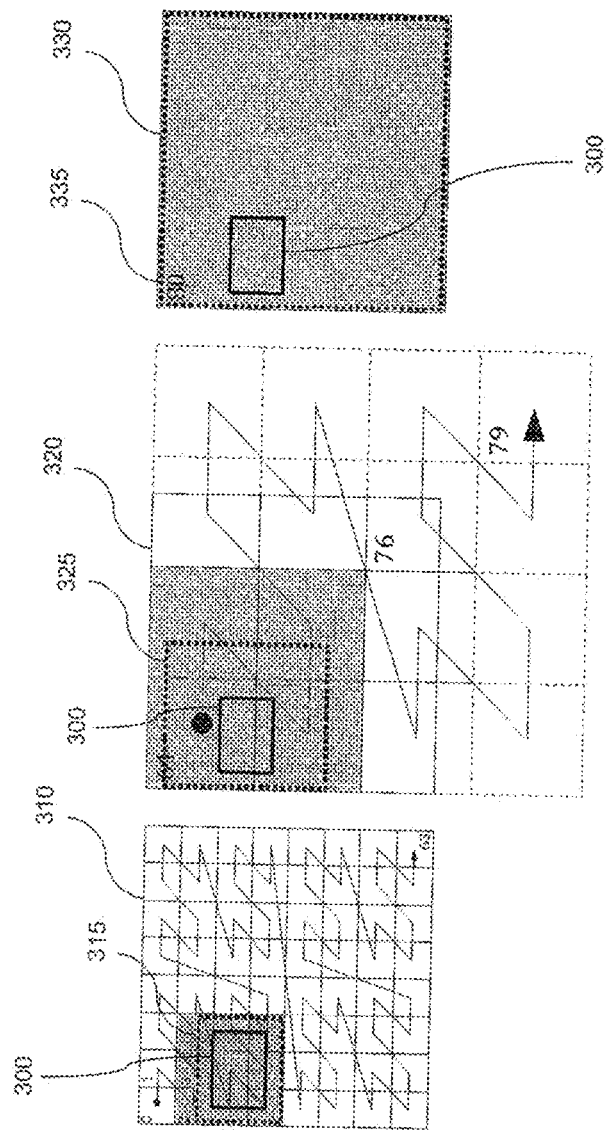
FIG. 14 is a schematic diagram illustrating an example of adjusted queries to be performed on three separations.

FIG. 14 illustrates an example of adjusted queries that is performed on three separations. For each separation 310, 320, 330, an adjusted window query 315, 325, 335 is formed by extending the window of the received window query 300 in all four directions by half the maximum spatial data object size of the separation (the adjusted window queries are restricted from extending outside the data space) and mapping each corner position of the adjusted window to one of a uniformly distributed plurality of mapped positions. In the figure, each separation is illustrated as having a plurality of blocks representing the index keys (the index keys and the blocks being derived through a mapping using a Z curve; for example, the first separation 310 comprises blocks 0 to 63). Every index key representing a block that intersects an adjusted window is put into a list of index key ranges (that is, as a range representing a continuous set of index keys). In FIG. 14, the list is thus {[2, 3], [6, 6], [8, 12], [14, 14]}. These index key ranges will then be queried for spatial data objects in the separations.

In an embodiment wherein the data space is mapped using space-filling curves (such as a Z curve or a Hilbert curve), one method of performing adjusted queries would be to scan or iterate over every block in the window query. This method however will require calling the mapping function of the space-filling curve for every block.

Instead of scanning or iterating over every block, if the data space is mapped using a Z curve, an adjusted query can be performed using a recursive algorithm to reduce calls to the Z curve mapping function. For example, if the separation is entirely covered by the window of the window query, the index key range of the entire separation is added to a list representing "candidate blocks" which may or may not intersect spatial data objects (the index key range can be determined by calling the mapping function of the Z curve on the first and last block in the region). If the window does not entirely cover the separation but instead covers only part of the separation, the separation is divided into $2^D$ smaller regions (where D is the dimensionality of the spatial data objects) if a cost model predicts that the cost of querying for spatial data objects in the separation is more than 1 page access. Since this dividing strategy is the same as how a space-filling curve divides the data space, the key range corresponding to each sub-region is very simple to compute. For example, let a 2-dimensional data space be indexed by a space-filling curve of an order $\lambda=3$. Then the key range of the data space is $[0, 2^{\lambda D}-1]=[0, 63]$ while the key ranges of its four sub-regions are:

$$\left[0, \frac{2^{\lambda D}}{2^D} - 1\right], \left[\frac{2^{\lambda D}}{2^D}, 2\frac{2^{\lambda D}}{2^D} - 1\right], \left[2\frac{2^{\lambda D}}{2^D}, 3\frac{2^{\lambda D}}{2^D} - 1\right],$$

$$\left[3\frac{2^{\lambda D}}{2^D}, 4\frac{2^{\lambda D}}{2^D} - 1\right],$$

which equal to [0; 15], [16; 31], [32; 47], and [48; 63], respectively. If the window does not entirely cover a smaller region, the index keys representing the smaller region are discarded. In an embodiment, the cost model for predicting the cost of querying for spatial data objects is $$E_C\langle q \rangle = \sum_{i=1}^{n} p_c \frac{1}{f \times u} [N(d_i) - N(d_{i-1})](\min\{1, q + d_i\})^D \quad (11)$$

where $P_c$ is the clustering performance for a particular space-filling curve, f is the number of spatial data objects in a page (also sometimes referred to as the "leaf node fanout"), u is the average node usage, D is the dimensionality of spatial data objects in the data space, and $N(d_i)$ is the total number of spatial data objects smaller than $d_i$.

Besides, the equation specified above may be replaced by the following equation $$E_C(q) = \qquad (12)$$

$$\sum_{i=1}^{n} P_c \left( \left\lceil \frac{N_i \left( \Pi_{j=1}^{D} \left( cdf_{i,j}\left(q \cdot u_j + \frac{1}{2}d_i\right) - cdf_{i,j}\left(q \cdot l_j - \frac{1}{2}d\right) \right) \right)}{f} \right\rceil + \frac{3}{2} \right)$$

Here, n is the total number of separations, $P_c$ is the clustering performance for a particular space-filling curve, $N_i$ represents the number of objects in the $i^{th}$ separation, $cdf_{i,j}(.)$ represents the function to compute the mapped position of an object position as defined foregoing, $q \cdot u_j$ represents the upper bound of the query window q at the $j^{th}$ dimension, $q \cdot l_j$ represents the lower bound of the query window q at the $j^{th}$ dimension, $d_i$ represents the separation size of the $i^{th}$ separation, D is the dimensionality of spatial data objects in the data space, and f is the number of spatial data objects in a page (also sometimes referred to as the "lead node fanout").

If the window covers a smaller region only partially, a cost model is used to predict the additional cost of querying for spatial data objects in this region: If the cost predicted is less than 1 page access, the region is treated as if it were entirely covered by the window and the region's index keys are added; if the cost is more than 1 page access, the region is divided again into $2^D$ smaller regions and the procedure is repeated recursively until the region size reaches a single block, in which case the key for that block is either added or not (depending on whether it intersects the window query).

Figure 15:
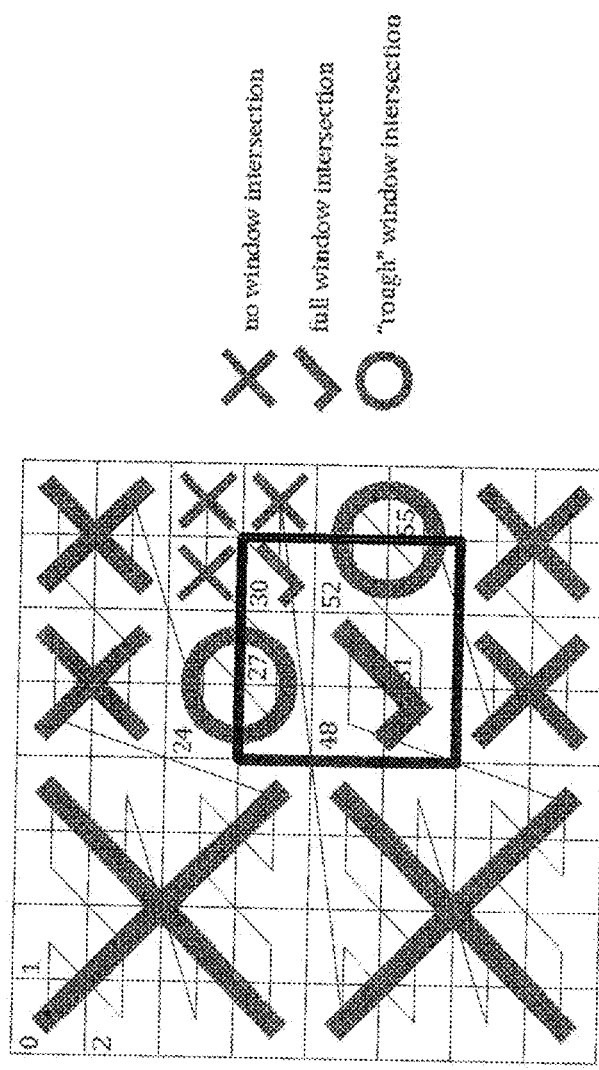
FIG. 15 is a schematic diagram of a recursive algorithm for determining a list of index key ranges representing spatial data objects that may intersect the window of an adjusted query.

FIG. 15 illustrates an example of the above recursive algorithm for a particular separation. Initially the separation is sub-divided into 4 sub-regions because a cost model predicted more than 1 page access to query for spatial data objects associated with the separation. Next, the index keys of the two left-most sub-regions were discarded because they do not intersect at all with the adjusted window query and the other two sub-regions were sub-divided again because of a further cost model prediction. Looking at the bottom-right sub-region it contained two sub-regions which did not intersect the adjusted window query (and thus the index keys representing the blocks covering these two sub-regions are discarded), one sub-region which was covered by the window query (and so the index keys representing the blocks covering this sub-region are added), and one sub-region which was partially covered where the cost model predicted less than 1 page access (and so the index keys representing the blocks covering this sub-region are added). The same process was applied to the top-right sub-region until {[24, 27], [30, 30], [48, 51], [52, 55]} is obtained as a rough list of index key ranges which intersect the window query. Compared with scanning or iterating over every block, the method described above (which is called as RoughMapRange for short herein after) can reduce the computational cost of mapping the window query by relaxing the key ranges corresponding to the window query.

In an embodiment wherein the data space is mapped using a Hilbert curve, one method of performing adjusted queries would be to consider only edge blocks to compute a list of index key ranges. Such a method would typically be advantageous if a data space has been mapped using a Hilbert curve (or other continuous curves) because the index keys of each range correspond to index keys which are always on the edge of the query window. In an embodiment, the method would look at each edge block to determine if the block is an entry or exit point to the query window. To determine if an index key is an entry/exit value, the inverse Hilbert mapping function can be used to check whether the previous/next value is outside the query window. If it is then this index key should be added to the list. Each entry point and each exit point is then added to a sorted list of index keys (as a point can be both an entry point and an exit point, the point may be added twice). At the conclusion of looking at each edge block, the list will have an even number of index keys (because there must be equal numbers of entry and exits points). This list can then be used to construct the list of index key range by pairing off entries in the list.

Figure 16:
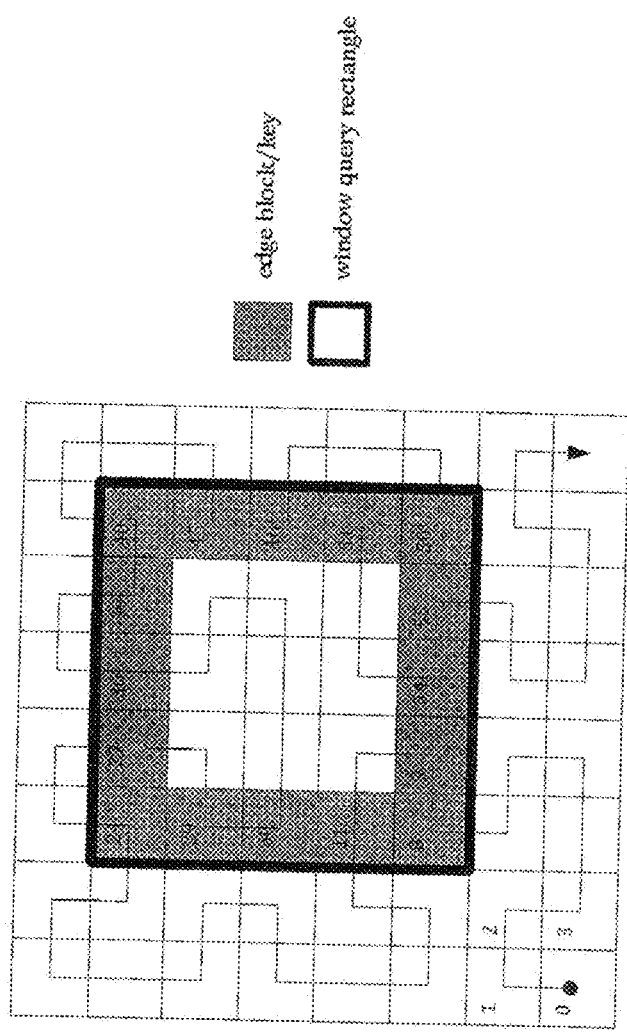
FIG. 16 is a schematic diagram of an alternative method for determining a list of index key ranges representing spatial data objects that may intersect the window of an adjusted query.

FIG. 16 illustrates an example of the above method for a particular separation. Looking at the data space from the top-left corner, index key 24 is added to the (initially empty) list twice since the block is both an entry and exit point to the adjusted window, making the list [24, 24]. Next, index key 27 is just an entry point so the list becomes [24, 24, 27]. Index key 29 is neither an entry or exit point so it is not added to the list. Eventually the list becomes [8, 11, 24, 24, 27, 36, 39, 40, 45, 46, 50, 55]. After pairing off the index keys in the list, a list of index key ranges is obtained for the index keys intersecting the adjusted window.

Compared with scanning or iterating over every block (which is called as ScanMapRange for short herein after), the method described above (which is called as EdgeMapRange for short herein after) can reduce the complexity. For a simple complexity analysis of the above method of performing adjusted queries, assume that the window query is a hyper-square and let $n_c$ be the number of cells on a side of the window query. Then there are $n_c^D$ cells in the window query, and the number of calls of C( ) in ScanMapRange is $O(n_c^D)$. The number of calls of C( )/ $C^{-1}$( ) in the above method is $O(n_c^{D-1})$. The improvement is most obvious when D=2, where the number of calls in ScanMapRange is $O(n_c^2)$ while that in EdgeMapRange is $O(n_c)$.

Figure 11:
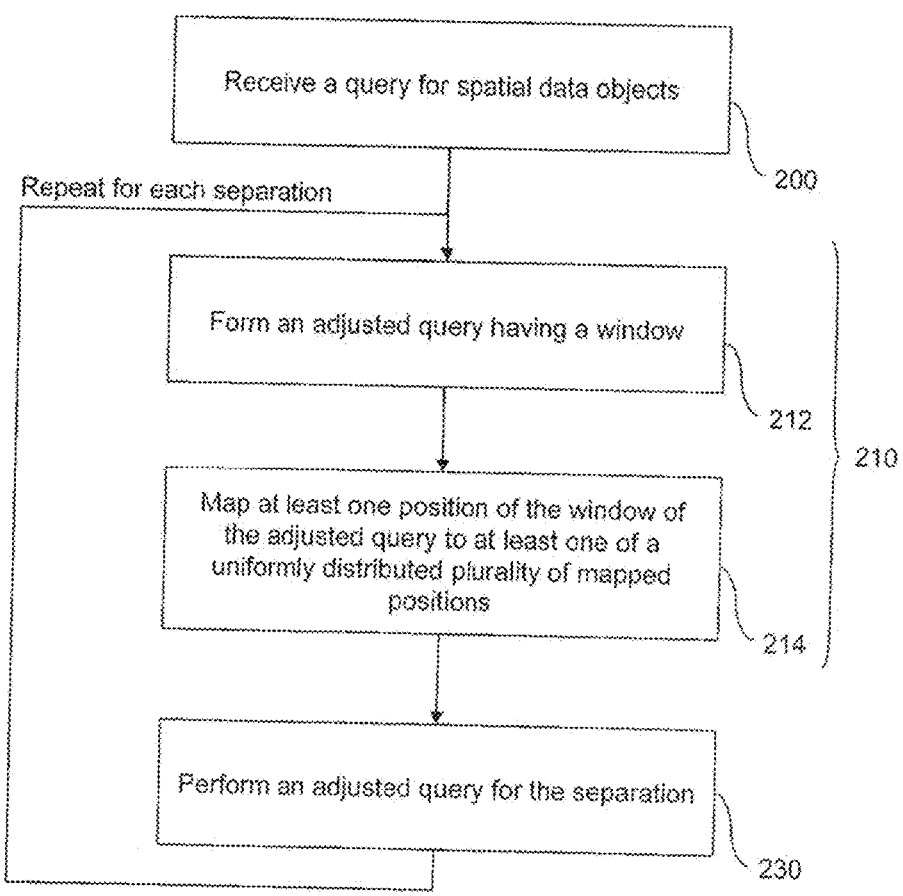
FIG. 11 is a flowchart illustrating steps for performing an operation on an index of spatial data objects associated with a plurality of separations.

FIG. 11 is a flowchart illustrating the steps for performing an operation on an index of spatial data objects.

First, a query is received 200. Then, adjusted queries are determined for each separation based on a size characteristic of the respective separation and the received query 210. For each separation, an adjusted query is determined by forming a query having a new window 212. At least one position of this window is then mapped to at least one of a uniformly distributed plurality of mapped positions 214. After mapping, the adjusted query is performed for spatial data objects in the separation 230.

Figure 12:
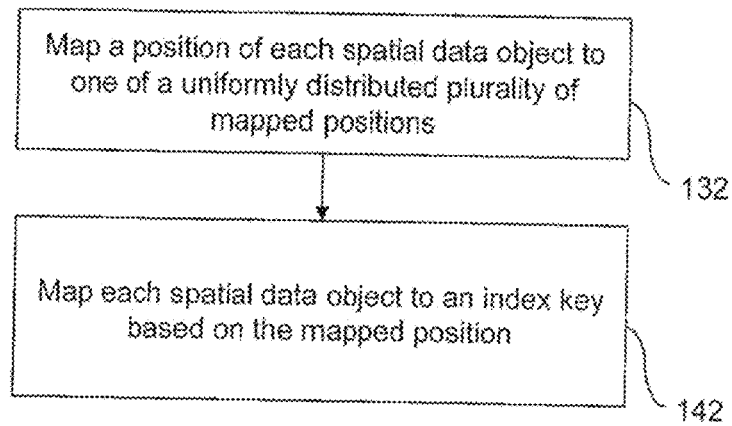
FIG. 12 is a flowchart illustrating the steps for indexing spatial data objects based on a plurality of uniformly distributed mapped positions.

FIG. 12 is a flowchart illustrating the steps for indexing spatial data objects based on a plurality of uniformly distributed mapped positions.

First, a position of each spatial data object is mapped to one of a plurality of mapped position 132. Each spatial data object is then mapped to an index key based on the mapped position of the respective spatial data object 142.

The aim of mapping a position of each spatial data object to one of a uniformly (or approximately uniformly) distributed plurality of mapped positions is to achieve a uniform (or approximately uniform) distribution for the objects in a separation. A cumulative distribution function (CDF) is used for the mapping and thus the mapping is named cumulative mapping.

The cumulative distribution function cdf (x) returns the percentage of data that are smaller than or equal to x. In each dimension j, a mapping $cdf_j$ (o) is defined, which returns the percentage of objects whose centroid coordinates are smaller than or equal to that of o in dimension j. Let $\langle o_1, o_2, \ldots, o_{|o|} \rangle$ be a permutation of the objects in O in ascending order of their centroid coordinates in dimension j. Then, $$cdf_j(o_k) = \frac{k}{|O|}, k = 1, 2, \ldots, |O| \qquad (13)$$

The CDF values of the objects are uniformly distributed in [0, 1] in 1-dimensional space. Thus, a mapping that generates a uniform distribution is achieved. Note that after the mapping, the whole data space is mapped into a unit hyper-cube space.

Obtain an exact CDF for cumulative mapping requires sorting all objects, which is expensive. Alternative, it may only compute the CDF values at a small number of coordinate values, which can be obtained by a scan on the data set and hence avoids the sorting. Then, these CDF values may be used to construct a piecewise mapping function (PMF) that approximates the exact CDF for the mapping.

Figure 19:
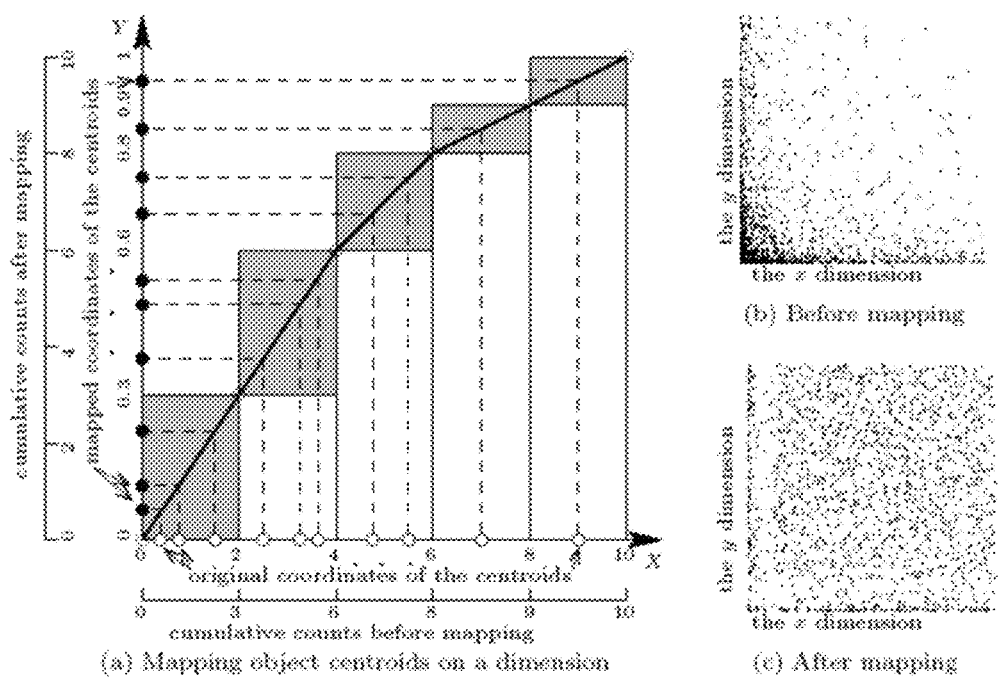
FIG. 19 illustrates an example of constructing a piecewise mapping function.

In the following, an example of constructing a piecewise mapping function as shown in FIG. 19 is used to illustrate how to construct the PMF.

The data domain in dimension j is evenly separated into $n_b$ buckets. Then the boundary coordinates of the buckets are the coordinates used to compute the PMF. In (a) of FIG. 19, which shows mapping object centroids on a dimension, the data domain [0, 10] in dimension X is divided into 5 buckets, and the boundary coordinates are 0, 2, 4, 6, 8 and 10. To compute their CDF values, compute the cumulative count firstly, which is the number of objects whose coordinates are smaller than or equal to a boundary coordinate. In the figure, the white dots denote the objects' centroid coordinates in dimension j. The cumulative counts of the boundary coordinates are 0, 2, 4, 6, 8 and 10, respectively, which can be obtained by scanning the coordinates once. Dividing the total number of objects, 10, the following CDF values of the boundary coordinates are got: 0, 3/10, 6/10, 8/10, 9/10, 1. Then plot the CDF values of the boundary coordinates in dimension Y (denoted by the dashed dots), and connect the plotted points by line segments, which results in a polyline shown as the dark black polyline starting from the origin. This polyline corresponds to the PMF used to approximate the CDF for the mapping. As shown by the black dots on the Y axis, after mapping by this function, the objects are distributed approximately uniformly within the data domain [0, 1].

Formally, the PMF to approximate the exact CDF is defined as follows. Let j be the current dimension for mapping, $|Z|_j$ be the data domain size on the $i^{th}$ dimension, $b_0, b_1, \ldots b_{n_b}$ be the $n_b+1$ boundary coordinates of the buckets, and $b_k \cdot c$ be the cumulative counts of $b_k$ ($k=0, \ldots, n_b$). Then given an object o, its centroid $o \cdot c$ is at $o \cdot c^j$ in the $j^{th}$ dimension, where $$o \cdot c_j = \frac{o \cdot u_j + o \cdot l_j}{2}.$$

Let $o \cdot c$ be in bucket k.

$$k = \left[\frac{o \cdot c_j}{|Z|_j} \times n_b\right] \quad (14)$$

The PMF used on the $j^{th}$ dimension to map $o \cdot c$ of an object o in partition i, denoted by $cdf_{i,j}(o \cdot c)$, is formally defined as follows.

$$cdf_{i,j}(o \cdot c) = \frac{\frac{b_{k+1} \cdot c - b_k \cdot c}{b_{k+1} - b_k}(o \cdot c_j - b_k) + b_k \cdot c}{|O_i|} = \frac{(b_{k+1} \cdot c - b_k \cdot c)(o \cdot c_j - b_k) + b_k \cdot c(b_{k+1} - b_k)}{|O_i|(b_{k+1} - b_k)} \quad (15)$$

Here, $O_i$ denotes the set of objects of partition i. Note that if $o \cdot c_j = |Z|_j$, then $k = n_b$ and hence $b_{k+1}$ will be undefined. In this case, $cdf_{i,j}(o \cdot c)$ is not computed by using Equation (15) but directly define it to be 1.

To further reduce the cost of computing the PMF, it may only compute the PMF on a small sample set $S_2$. Then $cdf_{i,j}(o \cdot c)$ becomes:

$$cdf_{i,j}(o \cdot c) = \frac{(b_{k+1} \cdot c - b_k \cdot c)(o \cdot c_j - b_k) + b_k \cdot c(b_{k+1} - b_k)}{|S_2|(b_{k+1} - b_k)} \quad (16)$$

(b) of FIG. 19 shows the circumstance before mapping, and (c) of FIG. 19 shows the circumstance after mapping. It can be seen that, after the cumulative mapping, a skewed 2-dimensional data set becomes a uniform (approximately uniform) data set. The approximation ratio of the PMF values over the CDF values, denoted by ρ, is derived as follows. At the bucket boundaries, the PMF and the CDF have the same values. The approximation ratio ρ is 1. For a point between two bucket boundaries, ρ is derived as follows. Assume that the objects between two adjacent bucket boundary coordinates $b_k$ and $b_{k+1}$ are sorted in ascending order of their centroid coordinates. Let o be the $m^{th}$ object and l be its distance to $b_k$. The CDF value of the centroid of o is $$\frac{b_k \cdot c + m}{|O_i|}.$$

The PMF value of the centroid of o may also be computed by Equation (15). Then, $$p = \frac{cdf_{i,j}(o \cdot c)}{\frac{b_k \cdot c + m}{|O_i|}} \quad (17)$$

$$= \frac{\frac{(b_{k+1} \cdot c - b_k \cdot c)(o \cdot c_j - b_k) + b_k \cdot c(b_{k+1} - b_k)}{|O_i|(b_{k+1} - b_k)}}{\frac{b_k \cdot c + m}{|O_i|}}$$

$$= \frac{(b_{k+1} \cdot c - b_k \cdot c)l + b_k \cdot c(b_{k+1} - b_k)}{(b_k \cdot c + m)(b_{k+1} - b_k)}$$

From the equation above, the exact value of ρ depends on the values of l and m of a specific object can be obtain. Then further derive upper and lower bounds of p that are irrelevant to any specific object. Since $1 \leq m \leq b_{k+1} \cdot c - b_k \cdot c$ and $0 < l < b_{k+1} - b_k$, have:

$$\frac{(b_{k+1} \cdot c - b_k \cdot c)0 + b_k \cdot c(b_{k+1} - b_k)}{(b_k \cdot c + b_{k+1} \cdot c - b_k \cdot c)(b_{k+1} - b_k)} < p < \quad (18)$$

$$\frac{(b_{k+1} \cdot c - b_k \cdot c)(b_{k+1} - b_k) + b_k \cdot c(b_{k+1} - b_k)}{(b_k \cdot c + 1)(b_{k+1} - b_k)} \Rightarrow$$

$$\frac{b_k \cdot c}{b_{k+1} \cdot c} < p < \frac{b_{k+1} \cdot c}{b_k \cdot c + 1}$$

Therefore, the number of buckets and the number of objects within a bucket define two bounds of ρ, and these bounds can be used to help determine the parameter values when construing the PMF to achieve a certain value of ρ.

After the cumulative mapping, further map the objects of each separation with a space-filling curve to obtain the index keys. The input of this mapping is the coordinates of an object o after cumulative mapping, and the output is the space-filling curve value of o. The curve values from different separations are separated by adding the total number of grid cells in the first $(i-1)^{th}$ separations to the curve values of separation i. This way, it only need one B+ tree to index the objects from all separations.

The challenge of this part is determining the order of the space-filling curve for each separation. A query processing algorithm involves two conceptual phases:

(i) identifying the cells intersected by the window query and from these cells, (ii) identifying the objects intersected by the window query.

Since a space-filling curve with larger cells (smaller order) has fewer cells and will make phase (i) less expensive, but it also has more objects in each cell and hence higher cost for phase (ii). A space-filling curve with smaller cells (higher order) has lower cost in phase (ii) but higher cost in phase (i).

To achieve a balance of the cost of the two steps, it is proposed to use the separation size value $\hat{f} \cdot d_i$ as the cell size. The intuition is letting a cell be large enough to enclose an object but not too large so as to avoid too many false positives in query processing. This way, every object will have only one index key. The size of the B+ tree to store these keys is reduced and the query possessing efficiency is improved. Note that the indexing is on object centroids. Every object centroid is in one cell and every object has only one index key already. It seems that the cell size can be even below $\hat{f} \cdot d_i$ to constrain false positives in query processing as much as possible. However, the query processing requires window query expansion. This effectively gives back the objects their extents. If the cells are too small, the expansion part of the window query will cover a lot of extra cells, which will result in high extra cost to map the window query.

Next, determine the order of the space-filling curve for partition i, denoted by $\lambda_i$. The conceptual grid corresponding to the space-filling curve should cover the whole data space. A space-filling curve of order $\lambda_i$ has $2^{\lambda_i}$ cells on each side, and each cell has a side length of $\hat{f} \cdot d_i$. Let $|Z|$ be the data domain size. Then $\lambda_i$ should satisfy $2^{\lambda_i} \hat{f} \cdot d_i \geq |Z|$, which means $$\lambda_i = \left\lceil \log_2 \frac{|Z|}{\hat{f} \cdot d_i} \right\rceil \tag{19}$$

As shown in FIG. 17, a partition has a separation size value of 0.28 so the cell size is 0.28. To cover the data space, which has a side length of 1, the order of the space-filling curve should be $$\left\lceil \log_2 \frac{|Z|}{\hat{f} \cdot d_i} \right\rceil = \left\lceil \log_2 \frac{1}{0.28} \right\rceil = 2. \tag{20}$$

Note that the resultant conceptual grid of the space-filling curve may be a bit larger than the data space, which means a cell on the right or bottom side may only overlap with the data space with a smaller region. As a result, the cell may contain a smaller number of objects and hence cause an uneven index key distribution. However, the smaller overlapping region of the cell also means a smaller probability that this cell is intersected by the query window. Therefore, the impact of the extra space of the grid on query processing performance is limited.

Now have a space-filling curve with $(2^{\lambda_i})^D$ cells. This is also the number of grid cells for separation i. Then, the total number of grid cells of the first $i^{th}$ separations, denoted by $v_i$, is computed as:

$$v_i = \sum_{k=1}^{i} (2^{\lambda_i})^D = \sum_{k=1}^{i} \left( 2^{\left\lceil \log_2 \frac{|Z|}{\hat{f} \cdot d_i} \right\rceil} \right)^D \tag{21}$$

Add $v_{i-1}$ to the curve values of the objects in separation i to avoid the overlap between the index key ranges of different separations. As a result, after the space-filling curve mapping and the curve value adding, obtain the index key of an object o of separation i, denoted by $ssi(o)$, computed as follows.

$$ssi(o) = C_i(\overrightarrow{cdf_i}(o \cdot c)) + v_{i-1} \tag{22}$$

Here, $\overrightarrow{cdf_i}(o \cdot c) = \langle cdf_{i,1}(o \cdot c), cdf_{i,2}(o \cdot c), \ldots, cdf_{i,D}(o \cdot c) \rangle$ returns the centroid coordinates of an object o after cumulative mapping, and $C_i(\square)$ returns the space-filling curve value of a given point in the data space. Function $C_i(\square)$ depends on the type and order of the space-filling curve used for separation i. Once the index keys of all objects are obtained, put them into a B+ tree to index the objects.

FIG. 17 shows an example where the number of separations $\hat{f} \cdot n$ is 3 and the orders of the space-filling curves (Z-curves in particular) used for the three separations are 3, 2 and 1, respectively. After cumulative mapping, the centroid of object $o_1$ in separation 1 is at cell 35, i.e., $C_1(\overrightarrow{cdf_1}(o_1 \cdot c)) = 35$, as shown in (a) of FIG. 17. Since there is no previous separation, i.e., $v_0 = 0$, object $o_1$ is assigned the key 35 directly. Thus, $ssi(o_1) = 35$. The centroid of object $o_2$ in separation 2 is located in cell 4 in (b), i.e., $C_2(\overrightarrow{cdf_2}(o_2 \cdot c)) = 4$, but separation 1 has occupied curve values 0 to 63, i.e., $v_1 = 64$. Therefore, assign $ssi(o_2) = 4 + 64 = 68$. Similarly, $ssi(o_3) = 0 + 80 = 80$.

As for an example, Algorithm 1 summarizes the size separation indexing process.

---

Algorithm 1: Size Separation Indexing

---

Data: D -dimensional object set O,
Result: A B+ tree indexing all object in O
1   for k ← 0 to $|S_1|-1$ do                 /*Sample object sizes */
2       randomly choose an object o from O
3       d[k] ← |o|
4   E* ← ∞                                     /*Estimated optimal cost*/
5   for n ← 1 to $n_{max}$ do                  /*Search for optimal configuration*/
6       for i ← 0 to n − 1 do                  /*Generate the first combination*/
7           chosen[i] ← i + 1
8       flag ← 1
9       while flag = 1 do
10          compute a window query cost estimation E for the combination of d[ ] marked by chosen[ ]
11          if E < E* then

| | Algorithm 1: Size Separation Indexing | |
|---|---|---|
| 12 | $E^* \leftarrow E$ , update $\hat{f}$ | /*Save optimal*/ |
| 13 | chosen[n − 1] + + | /*Generate the next combination*/ |
| 14 | if chosen[n − 1] ≤ $\|S_1\|$ then | |
| 15 | continue | |
| 16 | i ← n − 1 | |
| 17 | while chosen[i] ≥ $\|S_1\|$ − (n − 1 − i) do | |
| 18 | if − − i < 0 then | |
| 19 | flag ← 0, break | |
| 20 | chosen[i] + + | |
| 21 | while i < n − 1 do | |
| 22 | chosen[i + 1] = chosen[i] + 1 | |
| 23 | i + + | |
| 24 | separate O into $\hat{f}.n$ partitions according to $\hat{f}.\vec{d}$ | |
| 25 | for i ← 1 to $\hat{f}.n$ do | /*Map each partition*/ |
| 26 | for j ← 1 to D do | /*Map each dimension*/ |
| 27 | compute a CDF for cumulative mapping of partition i , dimension j | |
| 28 | forall o∈ partition i do | /*Cumulative mapping*/ |
| 29 | perform cumulative mapping on dimension j | |
| 30 | forall o∈ partition i do | /*Space-filling curve based mapping*/ |
| 31 | o.key ← ssi(o) | |
| 32 | insert ssi(o) into a B+ tree | /*Index object*/ |

(1) Size separation. The algorithm starts with sampling a set $S_1$ from O, which takes $O(|S_1|)$ time and space (lines 1 to 3). The size distribution of the objects in $S_1$ serves as an approximation of the size distribution of O. Based on the approximated size distribution, a cost model is used to search for a best size separation configuration $\hat{f}$ by computing and comparing the expected cost of processing a window query under different configurations (lines 4 to 23). Here, for each possible number of separations n, the different combinations of separation size values are generated using an algorithm that generates all size n combinations out of $|S_1|$ objects in the lexicographical order. The time complexity is $O(nC(|S_1|,n))$, where the $O(C(|S_1|,n))$ part denotes complexity of generating the combinations and the O(n) part denotes the complexity of cost model computation for a combination. The space complexity is $O(n_{max})$, which is for the auxiliary array chosen[ ] used for combination generation. To further reduce the computational cost of generating the combinations, first build a histogram on the object sizes and then generate the separation size combinations on the histogram, so that the number of combinations is reduced. After the best separation configuration $\hat{f}$ has been identified, the data set O is separated into $\hat{f}.n$ separations according to $\hat{f}.\vec{d}$, which takes $O(|O|)$ time and space (line 24).

(2) Cumulative mapping. Objects of each separation are mapped first by cumulative mapping to achieve an approximately uniform distribution (lines 25 to 29). Here, sampling a set $S_2$ and computing an approximated CDF function takes $O(|S_2|)$ time and space. This is done for D dimensions, which takes a total of $O(D|S_2|)$ time and space. The cumulative mapping of an object takes O(D) time and $O(D+n_b)$ space, where $O(n_b)$ denotes the space used for storing the boundary coordinates. Do the mapping for all objects, which takes $O(D|O|)$ time and $O(D|O|+n_b)$ space.

(3) Space-filling curve mapping and object indexing. The objects are then mapped by space-filling curve mapping (lines 30 and 31) to generate the index keys. The time and space complexities of this mapping is $O(|O|time(C))$ and $O(|O|space(C))$, where $O(time(C))$ and $O(space(C))$ denotes the time and space complexities of computing the curve value mapping function $C(\square)$, respectively. The generated keys are fed into a B+ tree to index the objects in O(line32), which takes $O(|O|log|O|)$ time and $O(|O|)$ space.

Figure 13:
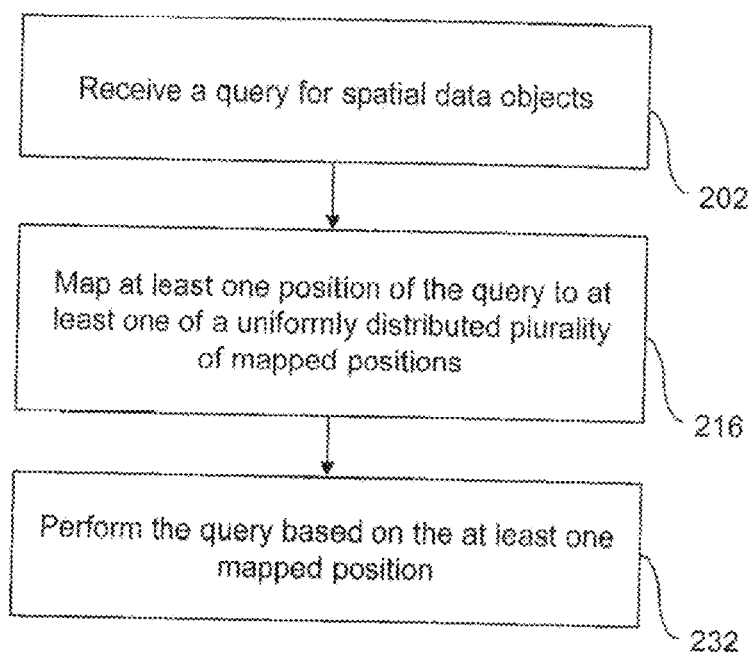
FIG. 13 is a flowchart illustrating the steps for performing an operation on an index of spatial data objects of a data space.

FIG. 13 is a flowchart illustrating steps for performing an operation on an index of spatial data objects of a data space according to an embodiment of the present invention.

First, a query for spatial data objects of a data space is received 202. At least one position of the query is then mapped to at least one of a plurality of mapped positions 216. A query is then performed based on the at least one mapped position 232.

It will be understood to persons skilled in the art of the invention that many modifications may be made without departing from the spirit and scope of the invention, in particular it will be apparent that certain features of embodiments of the invention can be employed to form further embodiments.

For example, the indexing systems of FIG. 8 and FIG. 9 may include an additional module mapping index keys to entries in a B+ tree if required.

Furthermore, an indexing system for indexing spatial data objects may include simply a data mapping module for mapping a position of each spatial data object to one of a uniformly distributed plurality of mapped positions, and an object mapping module for mapping each spatial data object to an index key based on the position to which a position of the spatial data object is mapped. In this respect, a system for performing an operation on an index of spatial data objects indexed by this system will simply comprise only a query receiving module for receiving a query having at least one position, a query mapping module for mapping the least one position of the query to at least one of a uniformly distributed plurality of mapped positions, and a query processing module for performing the query based on the at least one mapped position.

Furthermore, it should be understood, a cost model for predicting the cost of querying for spatial data objects assumes that, (i) the centroids of objects indexed in the method for indexing spatial data objects described above (which may be called as Size Separation Indexing, SSI for short) follow an approximately uniform distribution, and (ii) given the same window query, the comparative performance of SSI in different separation configurations is mainly determined by the different space-filling curves used in those configurations. Assumption (i) is valid because cumulative mapping is used to transform the centroids of the objects to a space where they are approximately uniformly distributed.

Assumption (ii) is valid because the query performance of a space-filling curve is fundamentally determined by an intrinsic property of the curve called the clustering property.

The following describes the cost model for predicting the cost of querying for spatial data objects in detail.

The total number of page accesses of processing a window query, denoted by a, is the sum of the numbers of page accesses of processing the query on all partitions. Denote the number of page accesses of partition i by $\alpha_i$.

Let $n_q$ be the number of objects intersected by the window query q. Then $\alpha_i$ increases with $n_q$.

1. Contiguous Cases.

Suppose that the $n_q$ objects intersected by q are indexed contiguously in the B+ tree and the capacity of a node (a page) in the tree is $C_{max}$. Derive the expectation of $\alpha_i$, denoted by $E(\alpha_i)$, as follows.

Figure 20:
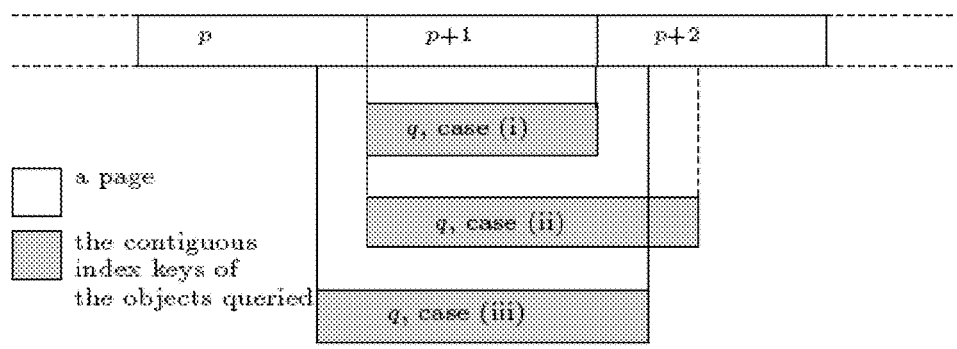
FIG. 20 illustrates an example of accessing objects intersected by the window query indexed contiguously in the B+ tree.

As FIG. 20 shows, q may cover $$\left\lfloor \frac{n_q}{C_{max}} \right\rfloor, \left\lfloor \frac{n_q}{C_{max}} \right\rfloor + 1, \text{ or } \left\lfloor \frac{n_q}{C_{max}} \right\rfloor + 2$$

nodes, depending on $n_q$ and the starting position of the $n_q$ objects in the nodes, denoted by s, s=0, 1, ..., m, ... $C_{max}$−1, Here, s=m means that the object with the smallest key among the $n_q$ objects is placed at the $m^{th}$ entry of a node. Rewrite $n_q$ to be $$n_q = \left\lfloor \frac{n_q}{C_{max}} \right\rfloor C_{max} + k, k = 0, 1, \ldots, l, \ldots C_{max} - 1.$$

Then, $$E(\alpha_i) = \sum_{l=0}^{C_{max}-1} \sum_{m=0}^{C_{max}-1} p(k = l, s = m)\alpha_{i,l,m},$$

where p (k=l, s=m) denotes the probability of k=l and s=m, and $\alpha_{i,l,m}$ denotes the number of leaf nodes accessed for the query on partition i when k=l and s=m.

For a random window query, p (k, s) should be the same for any combination of k and s in the Cartesian space of [0, $C_{max}$−1]×[0, $C_{max}$−1], i.e., $$p(k = 0, s = 0) = p(k = 0, s = 1) = \ldots = p(k = C_{max} - 1, s = C_{max} - 1) = \frac{1}{C_{max}^2}.$$

Thus, $$E(\alpha_i) = \frac{1}{C_{max}^2} \sum_{l=0}^{C_{max}-1} \sum_{m=0}^{C_{max}-1} \alpha_{i,l,m}.$$

Next, derive $$\sum_{m=0}^{C_{max}-1} \alpha_{i,l,m}$$

for each value of l, and sum the resultant values up to obtain the value of $E(\alpha_i)$.

(i) When l=0, if m=0, then $$\alpha_{i,l,m} = \left\lfloor \frac{n_q}{C_{max}} \right\rfloor;$$

otherwise, $$\alpha_{i,l,m} = \left\lfloor \frac{n_q}{C_{max}} \right\rfloor + 1.$$

$$\sum_{m=0}^{C_{max}-1} \alpha_{i,l,m} = \left\lfloor \frac{n_q}{C_{max}} \right\rfloor + (C_{max} - 1)\left(\left\lfloor \frac{n_q}{C_{max}} \right\rfloor + 1\right).$$

(ii) When $$l = 1, \alpha_{i,l,m} = \left\lfloor \frac{n_q}{C_{max}} \right\rfloor + 1,$$

regardless of the value of m.

$$\sum_{m=0}^{C_{max}-1} \alpha_{i,l,m} = 0\left(\left\lfloor \frac{n_q}{C_{max}} \right\rfloor + 2\right) + C_{max}\left(\left\lfloor \frac{n_q}{C_{max}} \right\rfloor + 1\right).$$

(iii) When l=2, if m=($C_{max}$−1), then $$\alpha_{i,l,m} = \left\lfloor \frac{n_q}{C_{max}} \right\rfloor + 2$$

(i.e., the first and the last two objects each resides in one node, while the rest of the objects reside in $$\left\lfloor \frac{n_q}{C_{max}} \right\rfloor$$

nodes); otherwise, $$\alpha_{i,l,m} = \left\lfloor \frac{n_q}{C_{max}} \right\rfloor + 1.$$

$$\sum_{m=0}^{C_{max}-1} \alpha_{i,l,m} = \left(\left\lfloor \frac{n_q}{C_{max}} \right\rfloor + 2\right) + (C_{max} - 1)\left(\left\lfloor \frac{n_q}{C_{max}} \right\rfloor + 1\right).$$

(iv) Similarly, when l>2, if m≥$C_{max}$−l+1, then $$\alpha_{i,l,m} = \left\lfloor \frac{n_q}{C_{max}} \right\rfloor + 2;$$

otherwise, $$\alpha_{i,l,m} = \left\lfloor \frac{n_q}{C_{max}} \right\rfloor + 1.$$

$$\sum_{m=0}^{C_{max}-1} \alpha_{i,l,m} = (l-1)\left(\left\lfloor \frac{n_q}{C_{max}} \right\rfloor + 2\right) + (C_{max} - l + 1)\left(\left\lfloor \frac{n_q}{C_{max}} \right\rfloor + 1\right).$$

Sum up the values of $\alpha_{i,j,m}$ and obtain:

$$\sum_{l=0}^{C_{max}-1} \sum_{m=0}^{C_{max}-1} \alpha_{i,l,m} \left\lfloor \frac{n_q}{C_{max}} \right\rfloor + (C_{max} - l + 1)\left(\left\lfloor \frac{n_q}{C_{max}} \right\rfloor + 1\right) +$$

$$\sum_{l=1}^{C_{max}-1} \left[(l-1)\left(\left\lfloor \frac{n_q}{C_{max}} \right\rfloor + 2\right) + (C_{max} - l + 1)\left(\left\lfloor \frac{n_q}{C_{max}} \right\rfloor + 1\right)\right] =$$

$$C_{max}^2 \left\lfloor \frac{n_q}{C_{max}} \right\rfloor + \frac{3C_{max}^2}{2}\left(1 - \frac{1}{C_{max}}\right)$$

Thus, $E(\alpha_i) = \left\lfloor \frac{n_q}{C_{max}} \right\rfloor + \frac{3}{2}\left(1 - \frac{1}{C_{max}}\right).$ Therefore, on average, the number of the leaf nodes accessed is $$\left\lfloor \frac{n_q}{C_{max}} \right\rfloor + \frac{3}{2}\left(1 - \frac{1}{C_{max}}\right).$$

Since in a B+ tree the number of the leaf nodes is much larger than that of the non-leaf nodes, and $C_{max}$ is usually quite large, thus $$\alpha_i \approx \left\lfloor \frac{n_q}{C_{max}} \right\rfloor + \frac{3}{2}. \tag{23}$$

2. General Cases.

More generally, the objects intersected by q are not indexed contiguously in the B+ tree because objects in the window query do not have strictly contiguous curve values. For example, in FIG. 16, a window query contains objects whose curve values are in multiple ranges. In this case the number of nodes to index these objects is larger than the number estimated by Equation (23). Thus, $\alpha_i$ increases. The scale of this increase, denoted by $p_{cur}$, is determined by how many of the objects intersected by the window query have contiguous curve values and how many do not, which in turn is determined by the clustering property of the space-filling curve cur used for object mapping. Studies on the clustering properties of different types of space-filling curves have shown that different types of curves have different degree of contiguity on the curve values of the objects in a window query. Deriving a close form formula to compute the degree of contiguity of each space-filling curve and to accurately predict its impact on the scale of page access increase will be very difficult if possible at all. However, since the scale of page access increase is an inherent property of a particular space-filling curve which is a constant. The value of $p_{cur}$ is obtained empirically. Next, analyze how $\alpha_i$ changes with $n_q$ and $C_{max}$ in order to formulate $\alpha_i$ as a function of $n_q$, $C_{max}$ and $p_{cur}$. Assume that the data objects are uniformly distributed in the data space, and that these objects are uniformly distributed in the leaf nodes of a B+ tree. Then given a window query q, the number of leaf nodes that contain objects intersecting q, denoted by A, is proportional to the volume of q in a D-dimensional space (area if D=2), denoted by v (q). Thus, $A \propto v(q)$. Meanwhile, the number of objects intersecting the window query, $n_q$, is also proportional to v (q), i.e., $n_q \propto v(q)$. Therefore, $A \propto n_q$.

As the objects are uniformly distributed in the tree nodes, A is inversely proportional to the capacity of tree nodes, i.e., $$A \propto \frac{1}{C_{max}}.$$

Together with $$A \propto n_q, A \propto \frac{n}{C_{max}}.$$

Processing window query q requires accessing the leaf nodes that contain the objects intersecting q and some non-leaf nodes. Since in a B+ tree the number of the leaf nodes is much larger than that of the non-leaf nodes, the number of tree nodes accessed for processing q, $\alpha_i$, is approximately the number of leaf nodes accessed for processing q, i.e., $\alpha_i \approx A$. Thus, $$\alpha_i \propto \frac{n_q}{C_{max}}.$$

From the analysis above we have also established that the scale of page access increase in the general case, $p_{cur}$, is a constant. Therefore, $$\alpha_i \propto p_{cur} \frac{n_q}{C_{max}}.$$

As a result, generalize Equation (23) and obtain $$\alpha_i \approx p_{cur}\left(\left\lfloor \frac{n_q}{C_{max}} \right\rfloor + \frac{3}{2}\right). \tag{24}$$

In the following, how to determine the parameters in the cost model is described in detail.

Firstly, derive the number of objects intersected by q, $n_q$, and then derive the scale of page access increase in the general case $p_{cur}$.

1. The Number of Objects Intersected by the Window Query ($n_q$).

Derive $n_q$ based on the ratio of the data space that is overlapped by the window query q. The idea is that, in a space where the data objects are uniformly distributed, the ratio of the objects contained in a window is approximately the ratio of the data space that is overlapped by the window. In SSI, after cumulative mapping, the objects are approximately uniformly distributed. Therefore, $$\frac{n_q}{n_i} \approx \frac{|q|}{|Z|},$$

where $n_i$, $\|q\|$, and $\|Z\|$ denote the number of objects in partition i, the area (or volume) of the window query, and the area (or volume) of the data space, respectively. Since after cumulative mapping the area (or volume) of the data space $\|Z\|$ becomes 1, it has:

$$n_q \approx n_i \|q\|. \tag{25}$$

1) Derive $\|q\|$. Based on the position of the lower bound $q \cdot l_j$ and upper bound $q \cdot u_j$ of q at every dimension j, window query expansion and cumulative mapping on q as described above can be performed to get $\|q\|$. Formally, $$\|q\| = \prod_{j=1}^{D}\left(cdf_{i,j}\left(q \cdot u_j + \frac{1}{2}d_i\right) - cdf_{i,j}\left(q \cdot l_j - \frac{1}{2}d_j\right)\right). \tag{26}$$

Here, $cdf_{i,\bullet}$ denotes the set of CDFs used for cumulative mapping in partition .i., while $d_i$ denotes the separation size value of partition i.

When use the cost model for determining the separation configuration, do not have a particular window query q q yet and hence do not have any particular position of $q \cdot l_j$ $q \cdot l_j$ or $q \cdot u_j$ $q \cdot u_j$. An integration on all positions of $q \cdot l_j$ $q \cdot l_j$ and $q \cdot u_j$ $q \cdot u_j$ is needed. Formally, $$\|q\| = \prod_{j=1}^{D} \int_0^{z_j} \int_{q \cdot l_j}^{z_j} \frac{cdf_{i,j}\left(q \cdot u_j + \frac{1}{2}d_i\right) - cdf_{i,j}\left(q \cdot l_j - \frac{1}{2}d_i\right)}{|Z|_j} \tag{27}$$

$$d(q \cdot l_j)d(q \cdot u_j).$$

Here, $|Z|_j$ denotes the data space extent on dimension j.

2) Simplifying $\|q\|$. Equation (27) gives an accurate size of q for separation configuration selection. However, it is an expensive equation to compute. Since it need to use the cost model frequently in configuration selection, the computation of $\|q\|$ is simplified as follows. The cost model assumes that data objects are uniformly distributed. The different positions of q should have similar selectivity effect on different partitions of the data set; the integration and cumulative mapping on the position of q do not affect the comparative result of the costs between different partitions much. Therefore, drop the integration and CDFs from Equation (27), and replace $q \cdot l_j$ and $q \cdot u_j$ with $|q|_j$ to denote the extent of q on dimension j. This results in $$\|q\| = \prod_{j=1}^{D}(|q|_j + d_i). \tag{28}$$

There is not a particular window query at separation configuration selection and hence not a value for $|q|$. Use the size of a "typical window query" $\tilde{q}$ of a hyper-square shape, denoted by $|\tilde{q}|$. The intuition is that, we just need a cost comparison on different separation configurations of SSI to help determine the best configuration. The same "typical window query" should have the same effect on computing the cost of different configurations, and thus does not change the comparative cost of different configurations. Therefore, $\|q\|$ is further simplified.

$$\|q\| = (|\tilde{q}| + d_i)^D. \tag{29}$$

This equation has low computation overhead. In our experimental study, the results show that the value of $|q|$ has very little impact on the configuration selection results.

2. The Scale of Page Access Increase in General Cases ($p_{cur}$)

To learn the value of $p_{cur}$ of a certain type of space-filling curve, implement SSI with the curve and then perform window queries using the implemented SSI. Record the actual number of page accesses and compare it with the number estimated by the cost model of the contiguous case $$\alpha_i \approx \left\lceil \frac{n_q}{C_{max}} \right\rceil + \frac{3}{2},$$

(in particular). Observe how large is the scale of page access increase in the general case when compared with the contiguous case.

Figure 21:
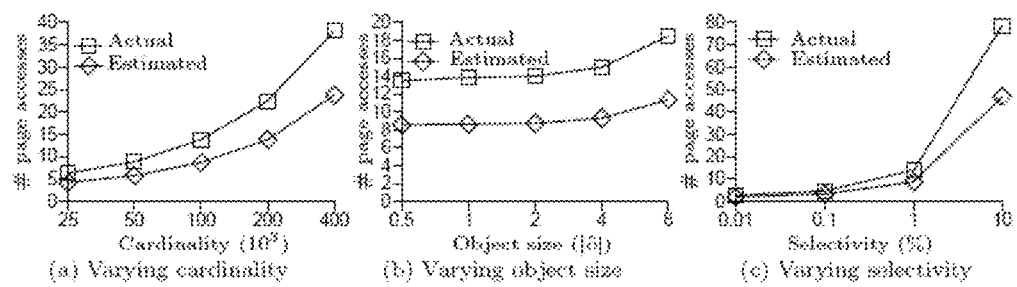
FIG. 21 illustrates an example of values of $p_{cur}$ on varying data set cardinality, object size and window query selectivity for the Hilbert-curve in 2-dimensional space.

FIG. 21 shows the result where we vary the data set cardinality, object size and window query selectivity to learn the value of $p_{cur}$ for the Hilbert-curve in 2-dimensional space[2], where $|\tilde{o}|$ denotes the average object size obtained from some real data sets. In the figure, the actual and the estimated numbers of page accesses are denoted by "Actual" and "Estimated", respectively. It can be observed that the actual number is always about 0.6 times larger than the estimated number. Compute the scale of increase at every data point and take the average as the value of $p_{cur}$, which results in $p_{cur}=1.5722$. Use this value in the cost model for the general cases $$\alpha_i \approx p_{cur}\left(\left\lceil \frac{n_q}{C_{max}} \right\rceil + \frac{3}{2}\right)$$

and re-estimate the number of page accesses for different settings. By comparing the re-estimated numbers with the actual numbers, the result shows that the maximum error rate is only 5.45%.

Similarly the values of $p_{cur}$ for the Z-curve and the Hilbert-curve in 2-dimensional space and 3-dimensional space are obtained, respectively. The values and their corresponding maximum cost model estimation errors are listed in Table 2. The achieved small estimation error rates (i.e., within 8.24%) validate the use of $p_{cur}$ and the cost model.

Then, $n_q$ and $p_{cur}$ can be integrated into Equation (7) to obtain the final forms of the cost model.

For separation configuration selection, use the simplified version of the cost model, where $n_q$ is computed by Equations (8) and (12):

$$\alpha_i \approx p_{cur}\left(\left\lceil \frac{n_i(|\tilde{q}| + d_i)^D}{C_{max}} \right\rceil + \frac{3}{2}\right). \tag{30}$$

For window query cost estimation, use the full version of the cost model, where $n_q$ is computed by Equations (8) and (9):

$$\alpha_i \approx p_{cur}\left(\left\lceil \frac{n_i\left(\prod_{j=1}^{D}\left(cdf_{i,j}\left(q \cdot u_j + \frac{1}{2}d_i\right) - cdf_{i,j}\left(q \cdot l_j - \frac{1}{2}d_i\right)\right)\right)}{C_{max}} \right\rceil + \frac{3}{2}\right). \tag{31}$$

Further aspects of the method will be apparent from the above description of the computing system. Persons skilled in the art will also appreciate that the system could be embodied in program code. The program code could be supplied in a number of ways, for example in a software program product including computer readable storage medium, such as a disc or a memory; or as a data signal (for example, by transmitting it from a server). For example, the indexing system can be provided by a software program product comprising programming code adapted to be executed so that a software program is installed on a computing system that is serving as a Database Management system (DBMS).

The indexing method for indexing spatial data objects of a data space provided by embodiments of the present application may be implemented in a full-fledged DBMS without modifying the DBMS kernel, details are described as following.

Create a table to store minimum bounding rectangles (MBRs) of the spatial objects, where the lower bounds and upper bounds of the MBRs on each dimension are stored in separate columns. Another column is needed to store unique ids for associating the MBRs with their corresponding spatial objects. These are all columns needed for enabling spatial queries on a full-fledged DBMS with no spatial support. In addition, SSI requires a column ssi_key in the table to store the SSI keys of the MBRs. The following is an example SQL statement to create a table that stores 2D objects for SSI.

```
CREATE TABLE table_name    (id INTEGER UNIQUE,
                            ssi_ key INTEGER,
                            lower_1 DOUBLE,
                            upper_1 DOUBLE,
                            lower_2 DOUBLE,
                            upper_2 DOUBLE);
Then create a B+ tree index on ssi_key.
CREATE INDEX index_name ON table_name(ssi_key);
```

Tables may be created to store the parameters for the SSI key computation. As shown in Equation (5), the parameters include the number of partitions $f\_n$, the data dimensionality D, the number of samples used for building the CDFs, $|S_2|$, the number of buckets used for building the CDFs, $n_b$, the data space size in each dimension $|Z|_j$, the order of the space filling curve used for each partition, $\lambda_i$, the total number of grid cells used in the first i partitions and the cumulative counts for each bucket boundary coordinate $b_k \cdot c$. Example SQL statements of creating tables to store these parameters are as follows.

```
CREATE TABLE  ssi_overall_parameter (f_n INTEGER, D INTEGER,
                S_2 INTEGER, n_b INTEGER) ;
```

-continued

```
CREATE TABLE  ssi_data_space_size (Z_j DOUBLE) ;
CREATE TABLE  ssi_curve_parameter (lambda_i INTEGER,
                v_i INTEGER) ;
CREATE TABLE  ssi_cdf_parameter (b_k_c INTEGER) ;
```

Given a data set, a C program is used to (i) generate the parameters for SSI key computation, (ii) compute the SSI key for each record, and (iii) insert the parameters as well as the SSI keys into the database tables in a DBMS through the DBMS' programming interface such as ODBC.

The above program is also used for data maintenance. When a new data record arrives, the program computes the SSI key for the record and generates an INSERT statement to insert it into the database table; when a record is to be deleted, the record id is passed to the program and the program generates a DELETE statement to delete the record from the database table; when a record's MBR is updated, the program first computes a new SSI key for the record based on the new MBR, and then generates an UPDATE statement to update the record in the database table. The following are example SQL statements for data maintenance as follows:

```
INSERT INTO table_name VALUES (o_id, o_ssi_key,
    o_lower_1, o_upper_1, o_lower_2, o_upper_2);
DELETE FROM table_name WHERE id = o_id;
UPDATE table_name SET ssi_key = n_ssi_key,
    lower_1 = n_lower_1, upper_1 = n_upper_1,
    lower_2 = n_lower_2, upper_2 = n_upper_2
WHERE id = o_id;
```

Here, o_id, o_ssi_key, o_lower_1, o_upper_1, o_lower_2 and o_upper_2 denote the object id, ssi_key and MBR boundaries, while n_ssi_key, n_lower_1, n_upper_1, n_lower_2 and n_upper_2 denote the new ssi_key and MBR boundaries of an object.

At query time, another C program can be used to process the window queries. Given a window query [w_lower_1, w_upper_1; w_lower_2, w_upper_2], this C program uses either EdgeMapRange or RoughMapRange to generate the corresponding SSI key ranges, and then constructs a SQL query statement that contains all generated key ranges to perform a window query on the database table through the DBMS' programming interface as follows:

```
SELECT   id
FROM         table_name
WHERE    (ssi_key BETWEEN    i_lower_1 AND i_upper_1 OR
          ssi_key BETWEEN    i_lower_2 AND i_upper_2 OR
          ...
          ssi_key BETWEEN    i_lower_k AND i_upper_k)
         AND (lower_1 <= w_upper_1 AND
         upper_1 >= w_lower_1 AND
         lower_2 <= w_upper_2 AND
         upper_2 >= w_lower_2) ;
```

Here, <i_lower_1, i_upper_1>, . . . , <i_lower_k, i_upper_k> represent the ranges of space-filling curve values that the window query is mapped to. The final AND clause is needed because the comparisons on ssi_key may return false positives, which need to be filtered by the window query directly.

Note that the above implementation of SSI is on top of an existing DMBS, which does not change the kernel of the DBMS. The transaction management issue is discussed as follows. With the above SSI implementation, a spatial database operation (i.e., insert, update, delete, and window query) is carried out in two steps: (i) our C program computes the SSI key for an object, or a set of key ranges in the case of a window query, and generates the corresponding SQL statements; (ii) the DBMS executes the generated SQL statements to update the index. The full ACID property of a transaction containing the above spatial operations can be achieved by applying transaction models such as 2PL and failure recovery mechanisms outside the DBMS, e.g., in the application layer where the DBMS is queried, or a service layer which wraps the access to the DBMS. If applied in the application layer, many platforms such as Spring for JavaEE can be used, which takes care of the transaction management in the business logic, and therefore little additional effort is needed. If applied in an independent service layer, tremendous effort can be avoided since the B+ tree implementation in the DBMS is leveraged to provide the ACID property in the second step. Overall, for the above SSI implementation, the transaction management can be achieved with a small amount of effort outside the DBMS. Alternatively, the SSI index technique can be integrated into the DBMS kernel (instead of on top of the DBMS) and let the DBMS handle the transaction management and failure recovery issues. This may offer even better efficiency of the SSI index technique.

Beyond supporting the ACID properties, SSI brings little negative impact to the transaction throughput to an RDBMS. Specifically, the logging and the locking issues are discussed as follows. As for locking when processing the window queries, both SSI and the mapping-based competitive methods, e.g., XZ-ordering, map the query window to a set of key values for searching on the B+ tree, which may incur shared locks on the corresponding values when performing transactions. The cost of such locks depends on the number of key values generated by the different methods. Given the same query, a method that generates more key values may have larger overhead of locking, and hence smaller degree of concurrency. Given the same data distribution and query, different mapping based methods should generate the same number of key ranges as the number of continuous space-filling curve intervals inside a window query remains the same irrespective of the mapping methods. Note that SSI has a distribution transformation step which makes the data more uniform, so SSI tends to generate a smaller number of continuous space-filling curve intervals compared to other mapping methods. This is confirmed by the experimental results. Please refer to the Performance of SSI as Integrated in a DBMS for details. When processing the same query SSI typically involves less page accesses, i.e., less false positives. Hence, SSI is expected to perform no worse than the other mapping based methods in terms of the degree of concurrency and the overhead of locking. R-Tree based methods are not competitive to SSI in terms of the concurrency control because the R-Tree is inherently much more complicated than the B+ tree. The overlaps between MBRs in an R-Tree may cause many nodes to be accessed concurrently and therefore locked during the query time.

EXPERIMENTAL STUDY

In this following, results of an experimental study on SSI are presented. Firstly, the effect of the different components on the performance of SSI is studied, then the query processing efficiency of SSI is compared with that of some existing spatial indexes when implemented as a standalone spatial index, and finally, the SSI is integrated into two off-the-shelf DBMSs and the query processing efficiency is compared with that of the spatial component of the two DBMSs. For each experiment, run 200 window quires and report the average number of page accesses and response time.

As an example, the experimental system has an Intel Core™ 2 Duo E600 processor, 2 GB RAM, and a 7200 RPM SATA hard drive with a page of 4096 bytes. All the algorithms are implemented in C and compiled using GCC 4.2.3 under Linux 2.6.24. Each float typed variable occupies 4 bytes in main memory. By default the indexes do not use buffers (I/O buffering of the operating system is allowed). In the experiments where we study the effect of buffer size, the buffer size is varied from 0 to 1200 pages and Direct I/O is used to bypass the I/O buffering of the operating system, i.e., use system function open( ) to open data files and set the O_DIRECT flag.

Three real data sets obtained from the R-tree Portal[3] are used: Germany hypsography data set, Tiger/Line LA rivers and railways data set, and Tiger streams data set. These data sets contain 76,999, 128,971 and 194,971 2-dimensional MBRs, and are denoted by "Hypsography", "Railway" and "Stream" data sets, respectively. Generate 3-dimensional real data sets from the 2-dimensional real data sets as follows. For each object o in a real data set, use the size of an object randomly chosen from the same data set as the extent of o in the $3^{rd}$ dimension. Then randomly place the object in the $3^{rd}$ dimension within the range of $[0,|Z|]$, where $|Z|$ denotes the data space size of the corresponding 2-dimensional real data set.

2- and 3-dimensional synthetic data sets with uniform and Zipfian distributions are also generated, respectively. In the uniform data sets, the object coordinates and extents in each dimension follow the uniform distribution in the range of [0, 1]. In the Zipfian data sets, the object coordinates and extents in each dimension follow the Zipfian distribution in the range of [0, 1]. The data set cardinality varies from 25,000 to 10,000,000 and the skewness parameter of the Zipfian data sets, denoted by $\theta_d$, varies from 0.2 to 0.8. Further, to evaluate the effect of object aspect ratio distribution, generate Zipfian data sets where the object aspect ratio also follows the Zipfian distribution and the skewness parameter $\theta_a$ varies from 0.2 to 0.8.

For window query performance study, generate window queries of selectivity varying from 0.01% to 10%.

Test both the Z-curve and the Hilbert-curve as the space-filling curve used in SSI. To constrain the index building and SSI key computation time, in the size separation stage, set the maximum number of partitions $n_{max}$ to be 4 and the sample set cardinality for size distribution estimation $|S_1|$ to be $\min\{|O|, 50 \log_2|O|\}$; in the cumulative mapping stage, set the number of buckets to be $\min\{|O|, 5 \log_2|O|\}$ and the sample set cardinality $|S_2|$ to be $\min\{|O|, 25 \log_2|O|\}$ for cumulative mapping function construction; in the cost model, set the typical window query size $|\tilde{q}|$ to be 1

Table 3 summarizes the parameters used in the experiments, where the default values are in bold.

TABLE 3

Data sets and parameters used in experiments

| | |
|---|---|
| Cardinality | 25000, 50000, 100000, 200000, 400000, 1000000, 10000000 |
| Dimensionality | 2, 3 |
| Distribution | uniform, Zipfian, real |
| Real data sets | Hypsography, Railway, Stream |
| Selectivity | 0.01%, 0.1%, 1%, 10% |
| Space-filling curves | Z-curve, Hilbert-curve |
| $\theta_d$ | 0.2, 0.4, 0.6, 0.8 |

TABLE 3-continued

Data sets and parameters used in experiments

| | |
|---|---|
| $\theta_a$ | 0.2, 0.4, 0.6, 0.8 |
| $n_{max}$ | 4 |
| $n_b$ | $\min\{|O|, 5\log_2|O|\}$ |
| $|S_1|$ | $\min\{|O|, 50\log_2|O|\}$ |
| $|S_2|$ | $\min\{|O|, 25\log_2|O|\}$ |

Effect of the Components of SSI

Here the effect of three SSI components are presented on query processing performance: cost model, cumulative mapping, and MapRange algorithms.

Effect of the Cost Model

1) Typical Window Size.

In separation configuration selection, a typical window query size $|\tilde{q}|$ is used in the cost model. In this set of experiments, it is verified that the choice of a particular value of $|\tilde{q}|$ does not affect much on the result of the configuration selection. The value of $|\tilde{q}|$ varies from $$\frac{0.1}{6.4} \text{ to } \frac{10}{6.4}$$

and the separation configuration selected by the cost model is observed. Repeat the experiment on different data sets and find that, on each data set, the separation configuration selected is almost always the same. This is because although the estimated cost of a separation configuration varies when $|\tilde{q}|$ is varied, the comparative cost of different separation configurations stays the same and hence the selection result does not change.

For the cases where the selection result changes, Setup SSI with the different configuration selected and measure their query processing performance. Table 4 shows the relative standard deviation of the number of page accesses and the response time of SSI of different configurations on 2-dimensional data sets (3-dimensional data sets give similar results and thus are omitted).

TABLE 4

Relative standard deviations when varying typical window size $(|\tilde{q}|)$

| Test Case | Number of Page Accesses | Response Time |
|---|---|---|
| uniform 2D data set | 0.00% | 2.10% |
| Zipfian 2D data set | 0.24% | 1.72% |
| Railway 2D data set | 1.06% | 2.68% |

It can be seen that the different configurations selected result in little performance difference of SSI. The number of page accesses only varies less than 1.1%, while the response time only varies less than 3%. Therefore, even in rare cases where the choice of a particular value of $|\tilde{q}|$ may result in a sub-optimal separation configuration, it has very little impact on the performance of SSI.

2) Cost Model Accuracy.

Figure 22:
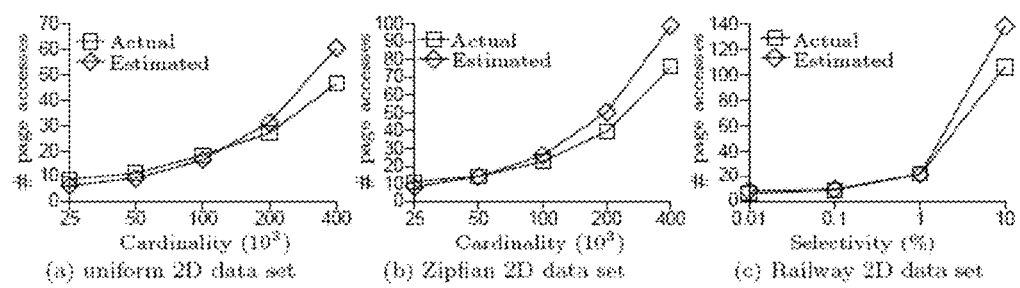
FIG. 22 illustrates accuracy of cost model according to an embodiment of the present invention.

Next we evaluate the accuracy of our cost model on different data sets with different parameter settings. Record the numbers of actual page accesses incurred (denoted by "\Actual"), and then compare them with the numbers of page accesses estimated by the cost model (denoted by "Estimated"). As FIG. 22 shows, the numbers of observed page accesses are very similar to their cost model estimated counterparts. The relative error on 2-dimensional data sets is within 30%. In particular, on uniform data sets, the error is the smallest, while on Zipfian and real data sets, the error is slightly larger. This is expected because the cost model is based on uniform data distribution. For non-uniform data sets, cumulative mapping can help obtain an approximately uniform distribution but it is not a strict uniform distribution. Thus, the accuracy of the cost model is slightly lowered. However, as the following experiments will show, the achieved cost model accuracy is good enough to produce an index structure that significantly outperforms other spatial indexes. Experiments on 3-dimensional data sets show similar patterns and thus the result is omitted.

Effect of Cumulative Mapping

Figure 23:
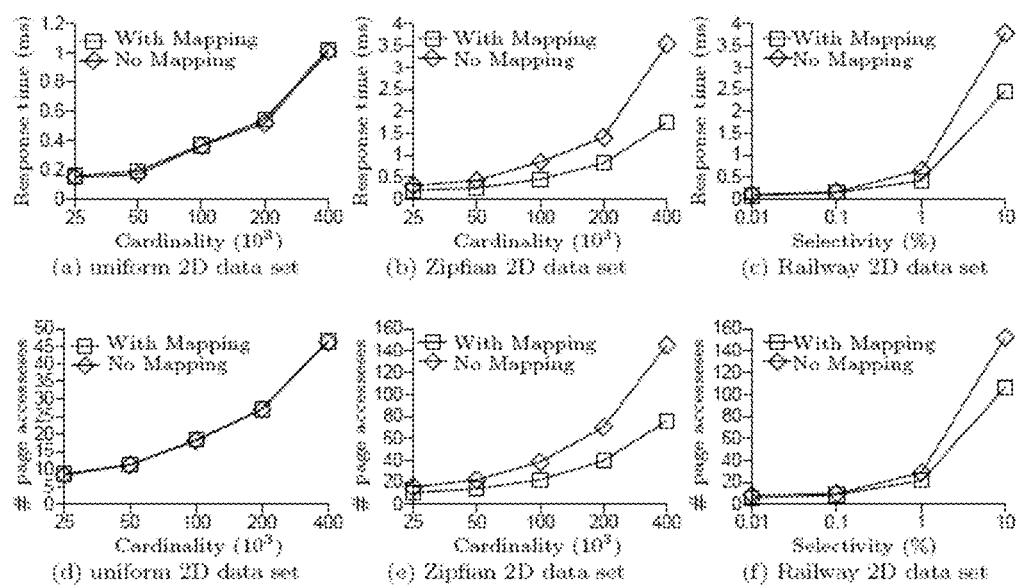
FIG. 23 illustrates an effect of cumulative mapping on window query performance according to an embodiment of the present invention.

Evaluate the query processing performance of SSI with and without cumulative mapping to justify the use of cumulative mapping. As shown in FIG. 23, SSI with cumulative mapping outperforms SSI without cumulative mapping in most cases in terms of both the number of page accesses and the response time. For the data sets with Zipfian distribution and large cardinality, the effect of cumulative mapping is most obvious (up to 60% improvement in response time on the Zipfian data set with 400,000 objects, cf. (b) of FIG. 23). This is because mapping based indexes do not perform very well on highly skewed data, but with cumulative mapping, an efficient mapping is achieved based index.

There is also considerable improvement on the real data set (37% improvement in response time when the query selectivity is 10%, cf. (c) of FIG. 23) as real data are usually skew. For uniform data sets the effect of cumulative mapping is minimum. SSI with cumulative mapping is slightly slower because it needs cumulative mapping on the window query (computing Equation (3)), but the difference is barely observable (cf.(a) and (d) of FIG. 23).

Effect of MapRange Algorithms

To evaluate the performance of different MapRange algorithms, vary the query selectivity from 0:01% to 10%. Measure the response time and the number of page accesses of five MapRange algorithms in SSI to process window queries, i.e., ScanMapRange, EdgeMapRange, RoughMapRange, GetNextH and GetNextZ. In the results we use "S", "E", "R", "H" and "Z" to denote the five algorithms, respectively. Here show the time for window query mapping as well as B+ tree searching, as denoted by "Map" and "Query", respectively. Here, GetNextH is a MapRange algorithm adapted from the calculate next match algorithm [Lawder and King 2001] for the Hilbert-curve and GetNextZ [Ramsak et al. 2000] is an existing MapRange algorithm for the Z-curve (cf. Space filling curves). More specifically, Lawder and King's algorithm is adapted as follows so that it can map the window query without accessing the B+ tree index and hence without accessing any disk pages.

Let q be the window query and Z be the entire data space. Use Z\q to denote the region in Z that that is not covered by q. Start the mapping with feeding 0 into calculate next match algorithm to find the first Hilbert-value within q, denoted by $h_0$. Then treat Z\q as the window query, and feed $h_0$ into calculate next match to find the first Hilbert-value within Z\q that is larger than $h_0$, denoted by $h_1$. The value $h_1$ is also the next Hilbert-value that exists q. Now we have a Hilbert-value interval $[h_0, h_1-1]$ that is covered by q. Then feed $h_1$ into calculate next match and repeat the procedure above to identify the next calculate next match by q. This process continues until calculate next match meets the end of the curve, which will give us all Hilbert-value intervals enclosed by q. The above adapted algorithm is GetNextH. Note that our study focuses on MapRange algorithms that do not require accessing the data pages. Therefore, existing algorithms that access the data pages during mapping are not considered.

1) First, compare EdgeMapRange with ScanMapRange and GetNextH on the Hilbert curve. In this set of experiments we only report the response time since the three methods have the same numbers of page accesses because they differ in the process of generating the key ranges for the B+ tree search but generate the same key ranges.

Figure 24:
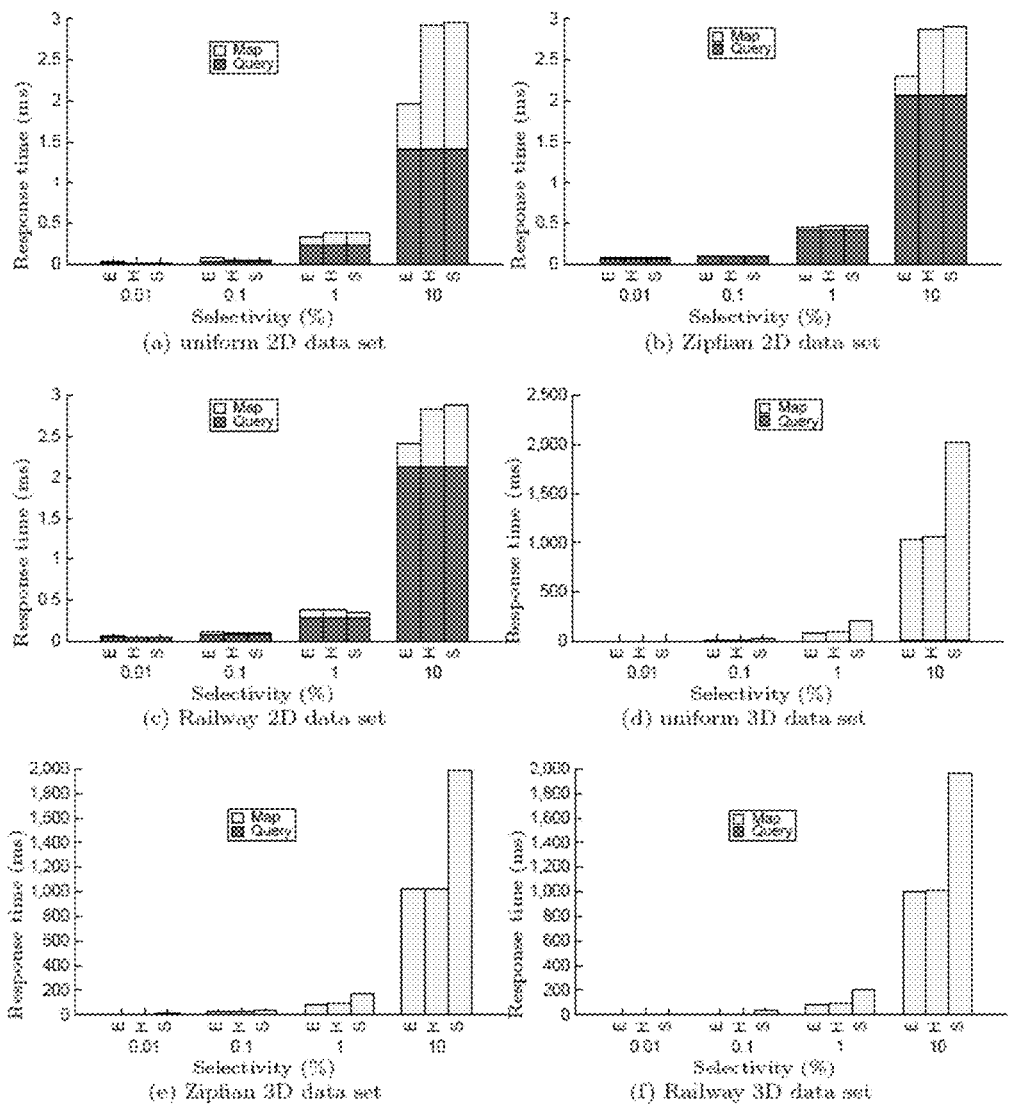
FIG. 24 illustrates effect of EdgeMapRange on window query performance according to an embodiment of the present invention.

On 2-dimensional data ((a) to (c) of FIG. 24) the two MapRange algorithms show very similar performance; when the query selectivity increases, EdgeMapRange gradually shows its advantage. On 3-dimensional data ((d) to (f) of FIG. 24), EdgeMapRange outperforms ScanMapRange by 2 times on average (note that the "Query" time is very small and barely observable in these figures). These observations can be explained as follows. When the data dimensionality and the query selectivity are both low, the window query is very small. Thus, all three algorithms only compute the curve value for a few cells. The dominating cost of query processing is the B+ tree search after MapRange, which is the same for any of the three algorithms. When the window query gets larger, the numbers of curve values computed increase and this cost becomes the dominating factor in query processing. EdgeMapRange computes fewer curve values. Thus, EdgeMapRange gradually outperforms ScanMapRange. GetNextH also computes fewer curve values, but it takes more time for each computation. Therefore, EdgeMapRange also outperforms GetNextH. When the data dimensionality grows the numbers curve value computations of EdgeMapRange and GetNextH grow much slower than that of ScanMapRange. As a result, on 3-dimensional data EdgeMapRange and GetNextH both outperform ScanMapRange significantly. Meanwhile, GetNextH computes fewer curve values than EdgeMapRange does, which makes up for its relatively higher cost for each computation. Thus, GetNextH and EdgeMapRange have similar performance.

2) Next, compare RoughMapRange with ScanMapRange and GetNextZ. We report both the response time and the number of page accesses to evaluate how much performance gain in response time can be achieved by RoughMapRange and how much page access overhead it has.

Figure 25:
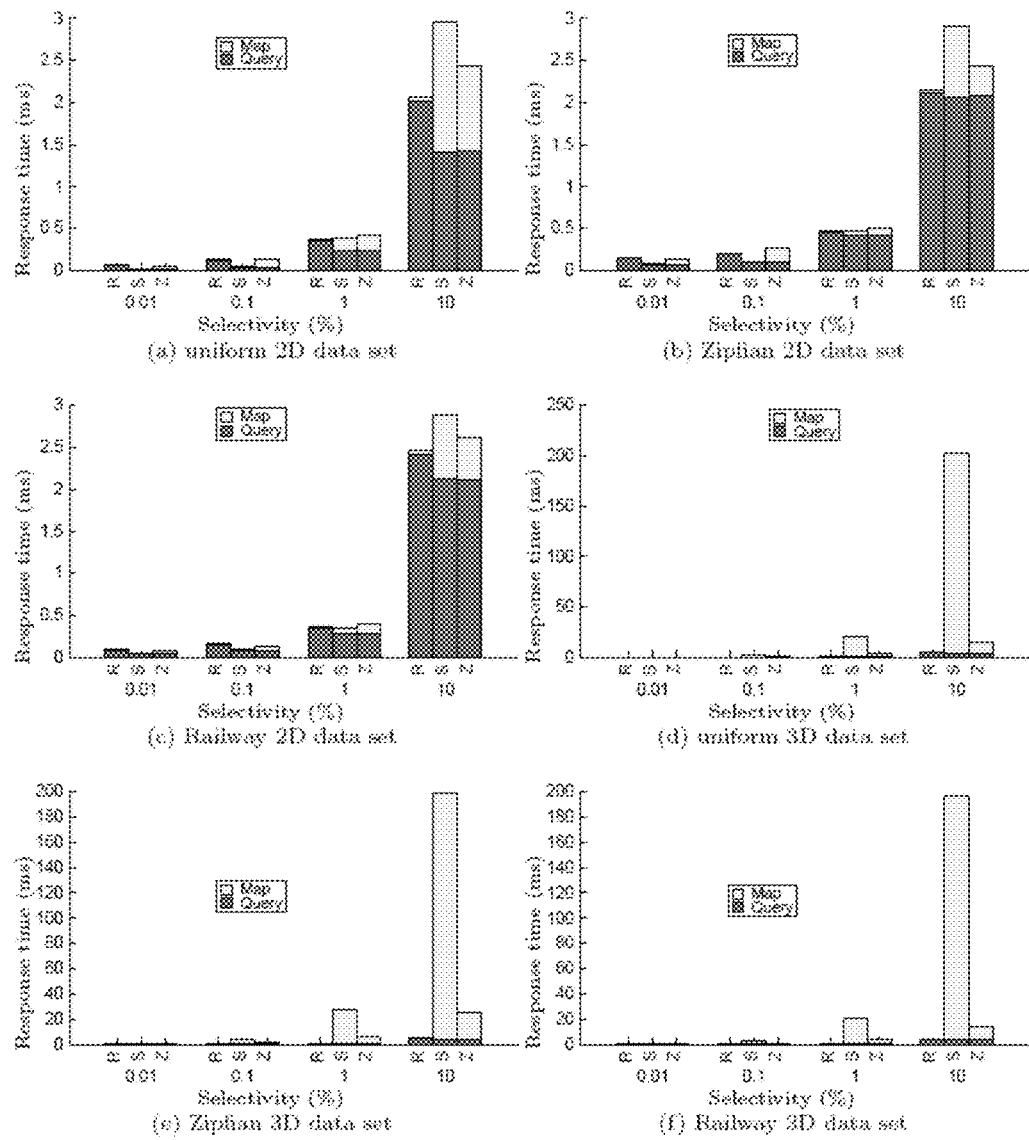
FIG. 25 illustrates response time performance according to an embodiment of the present invention.

FIG. 25 shows the response time. On 2-dimensional data, all three methods have similarly small response time when the query selectivity is less than 1%. When the query selectivity gets larger, the response time of ScanMapRange increases the fastest while that of RoughMapRange increases the slowest. That of GetNextZ lies in between the two. On 3-dimensional data, RoughMapRange shows clearer advantage. It outperforms ScanMapRange by an order of magnitude and GetNextZ by more than 3 times. This is because ScanMapRange calls the C( ) function for too many times on 3-dimensional data while RoughMapRange does not call the C( ) function at all. GetNextZ does not call the C( ) function explicitly, but it requires some computation that is similar to the C( ) function.

Figure 26:
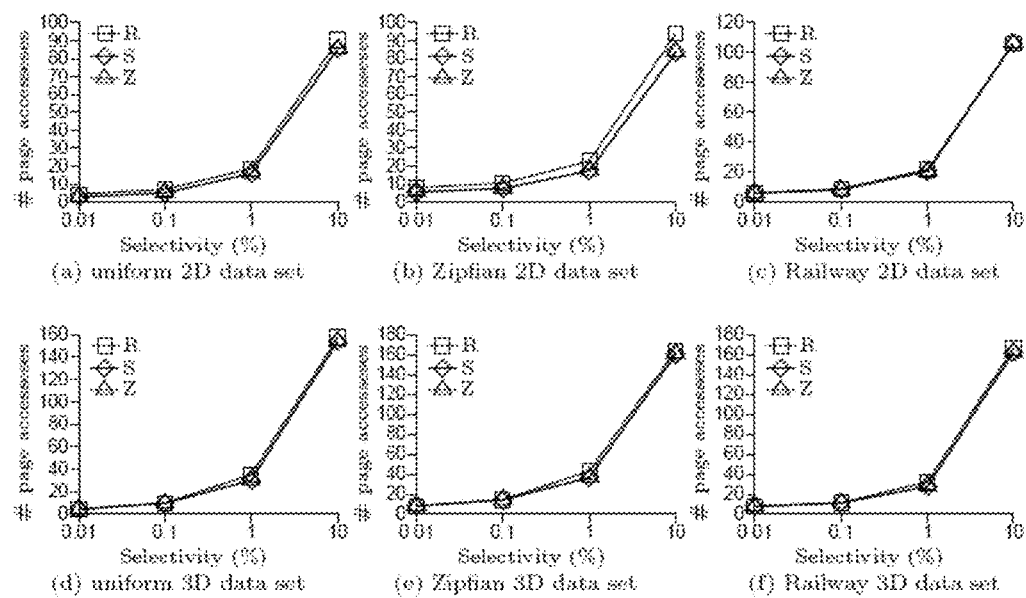
FIG. 26 illustrates page access performance according to an embodiment of the present invention.

FIG. 26 shows the page access performance RoughMapRange has slightly larger numbers of page accesses because it relaxes the process of generating the key ranges. However, it can be seen that RoughMapRange has a much less overall query response time, this is because its low computation cost outweighs the overhead incurred by a smaller number of extra page accesses. GetNextZ generates the same index key ranges as ScanMapRange does and hence the numbers of page accesses for these two algorithms are the same.

Performance of SSI as a Standalone Implementation

Here we evaluate the performance of various indexing methods as standalone implementations. The experiments consider 10 methods: SSI with Zcurve (denoted by "SSI-Z"), SSI with Hilbert-curve (denoted by "SSI-H"), $B^{dual}$ tree (denoted by "B-dual"), Sequential Scan (denoted by "Scan"), the R* tree (denoted by "R* tree"), Dual-transform with space-filling curves of orders from 2 to 5, (denoted by "DT-2" to "DT-5", respectively) and Size Separation Spatial Join (denoted by "SSSJ").

Experiments on 2-dimensional Data Sets

Figure 27:
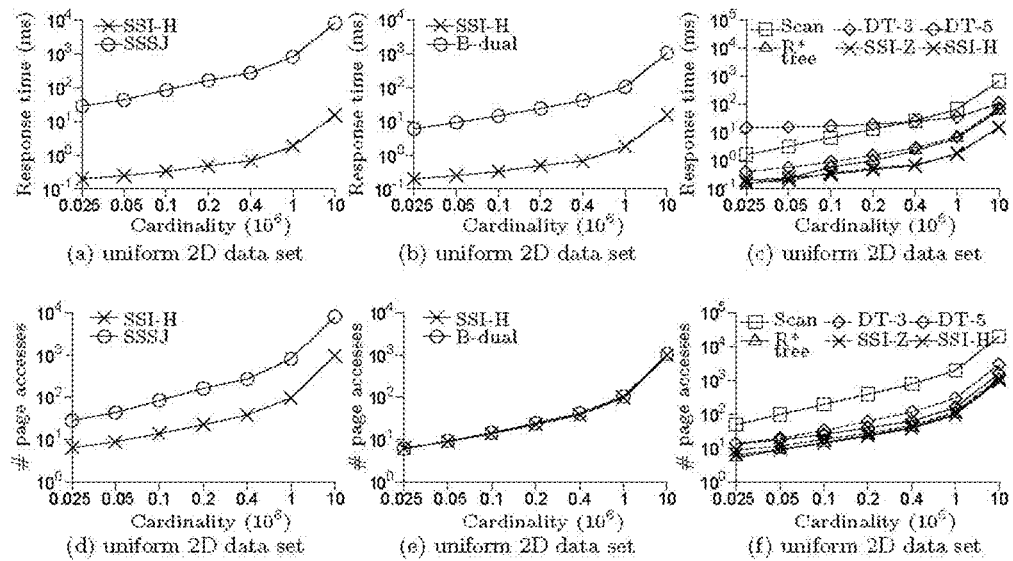
FIG. 27 illustrates query performance on uniform 2D data set of the standalone index implementations according to an embodiment of the present invention.

FIG. 27 shows the query performance on 2-dimensional uniform data where we vary the data set cardinality. The response time of SSSJ, B-dual and other methods are presented in three figures, (a), (b) and (c) of FIG. 27, respectively, rather than in the same figure because they are in very different ranges. From these figures it can be seen that SSSJ performs the worst. Its response time is in tens of milliseconds for a data set with only 25,000 objects. Considering that in real systems there are commonly tens of thousands of users performing queries at the same time, this response time is too slow to provide satisfactory user experience. B-dual, Scan, DT-3 and DT-5 are slightly faster (response time of DT-2 and DT-4 are between DT-3 and DT-5 and hence are omitted). SSI-Z and SSI-H outperform all the above methods significantly. Their response time are around 1 millisecond for the data set of 1 million objects. R* tree is the closest to the SSI methods. Its response time is around 10 milliseconds for the data set of 1 million objects.

The corresponding numbers of page accesses of these methods are shown in (d), (e) and (f) of FIG. 27, respectively. The SSI methods also show good performance in page access, although the scale of performance difference in page access is different from that in response time. The R* tree shows the smallest number of page accesses, while the SSI methods' page access numbers are very close to that of the R* tree.

Figure 28:
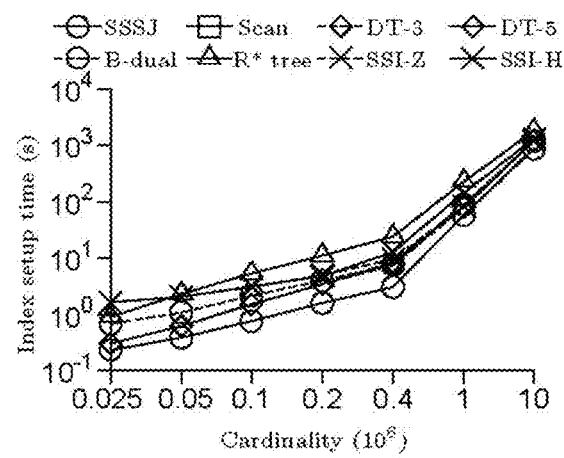
FIG. 28 illustrates index setup time of the uniform 2D data of the standalone index implementations according to an embodiment of the present invention.

The index setup time is shown in FIG. 28, where no bulk loading is used for any index. As expected the methods with high query processing time have relatively low index setup time. Specifically, Scan does not require any setup time at all; SSSJ, B-dual and the DT methods can all index 1 million objects in around 80 seconds. SSI-Z and SSI-H are slightly slower, with 90 and 144 seconds to build an index on 1 million objects; R* tree is the slowest, which requires 229 seconds to do the same. Considering the high performance gain in the query processing time, and that the index setup is only performed once for a long time, the slightly higher setup cost of the SSI methods is worthwhile.

Since we focus on getting low query response time, in the following experiments, omit presenting the page access and index setup time results to keep the paper concise, as they have similar behavior to those of the above experiments. Also, since the other methods are highly uncompetitive, only the results of R* tree, SSI-H and SSI-Z for the following set of experiments will be shown here.

Figure 29:
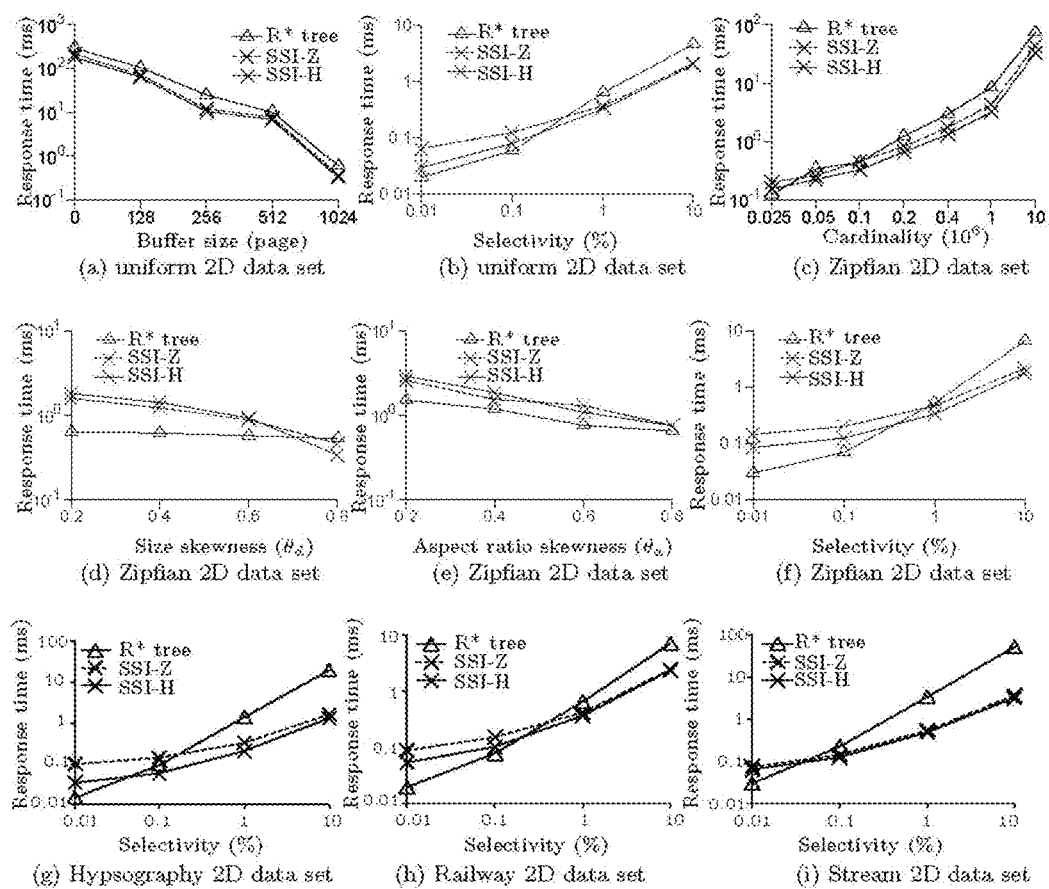
FIG. 29 illustrates query processing time on other 2-dimensional data sets and parameter settings according to an embodiment of the present invention.

FIG. 29 shows the query processing time on other 2-dimensional data sets and parameter settings. Specifically, in (a) of FIG. 29 the number of buffer pages varies from 0 to 1024. In this set of experiments the number of index pages of R* tree, SSI-Z and SSI-H are 682, 869 and 838, respectively, and the percentage of the index buffered ranges from 0% to 100% for each method. In (b) of FIG. 29 we vary the window query selectivity on the uniform data set. From (c) to (f) of FIG. 29 we vary the cardinality, the skewness of the object size distribution, the skewness of the object aspect ratio distribution and the window query selectivity on the Zipfian data sets. From (g) to (i) of FIG. 29 we vary the window query selectivity on real data sets.

It can be seen from these figures that the SSI methods outperform the R* tree in most cases. Only when the query selectivity is very small (i.e., less than 0.1%) or the object size is very skew that the R* tree shows a smaller response time (cf. (b), (d) and (e) of FIG. 29). Meanwhile, the SSI methods show relatively steady performance when the experimental parameter values are varied. This demonstrates the robustness of the SSI methods.

Experiments on 3-Dimensional Data Sets.

Figure 30:
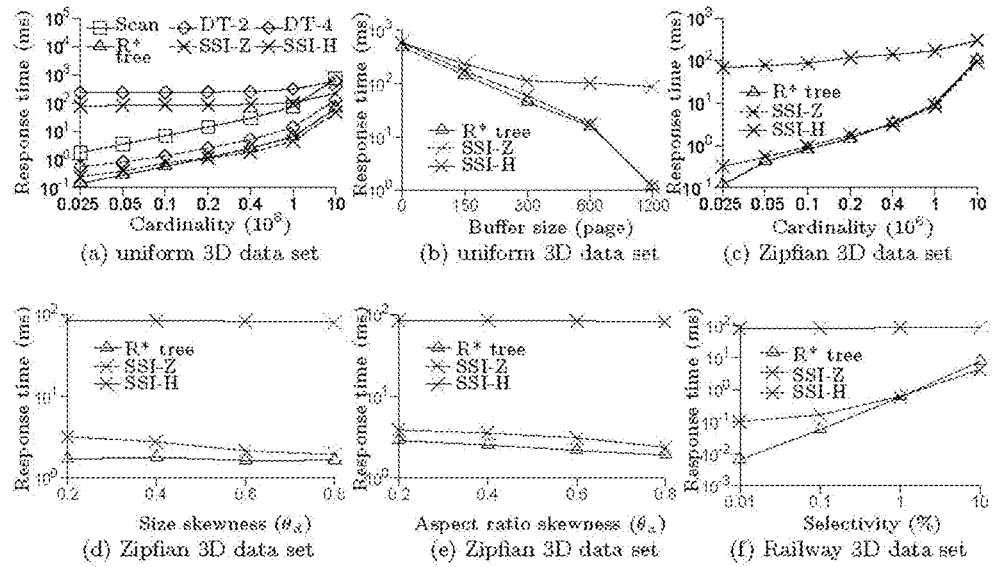
FIG. 30 illustrates query processing time on 3-dimensional data sets according to an embodiment of the present invention.

FIG. 30 shows the query processing time on 3-dimensional data sets. Among the various methods, SSSJ and B-dual perform as bad as they did in the experiments on the 2-dimensional data sets and hence are omitted. DT-5 cannot finish after hours. DT-5 is so slow because it involves curve value mapping of a space-filling curve of order 5 in a 6-dimensional data space. Therefore, it is not included in the results.

(a) of FIG. 30 shows the result where the data set cardinality is varied. It can be seen that, like the experiments above, SSI-Z and R* tree have the smallest response time and they both significantly outperform other methods. DT-2 is close while DT-4 is the worst. The response time of DT-3 is between DT-2 and DT-4 and hence is omitted. It can be observed that SSI-H shows less competitive performance. This is because of the relatively high complexity of curve value mapping on the Hilbert-curve in 3-dimensional space, which dominates the query processing cost. It can also be seen that the response time of SSI-H is quite stable when the data set cardinality increases. As a result, it becomes closer to the response time of the other methods as the data set cardinality increases.

In (b) of FIG. 30 we vary the number of buffer pages from 0 to 1200. Since in this figure the number of index pages of R* tree, SSI-Z and SSI-H are 977, 1131 and 1128, respectively, the percentage of the index buffered ranges from 0% to 100% for each method. It can be observed that the response time decreases for all methods as more buffer pages are used. SSI-Z and R* tree show similar performance constantly, while SSI-H also shows similar performance to R* tree when fewer buffer pages are used, where the I/O time becomes dominating in the query processing cost.

From (c) to (e) of FIG. 30 we vary the cardinality, the skewness of the object size distribution and the skewness of the object aspect ratio distribution on the Zipfian data sets. The comparative performance of SSI-Z, SSI-H and R* tree is similar to that on uniform data sets.

In (f) of FIG. 30 we vary the query selectivity on real data. Again, R* tree and SSI-Z show close performance and SSI-Z performs better when the query selectivity gets large (i.e., larger than 1%). This is because when the query selectivity increases, the tree-based pruning of R* tree degrades quickly.

Based on the above, the experimental results can be summarized as follows.

The SSI methods outperform other mapping based indexing methods by orders of magnitude in various data sets and experimental settings in terms of both response time and page access.

The SSI methods show competitive performance when compared with R* tree. They outperform R* tree for most cases (i.e., when the data set cardinality is larger than 50,000 or the query selectivity is larger than 0.1%) on 2-dimensional data. For 3-dimensional data, SSI-Z has very similar performance to R* tree for most cases and outperforms R* tree when the data set cardinality is large; SSI-H shows less competitive performance but is still close to SSI-Z where the data set cardinality or window query selectivity is large.

Performance of SSI as Integrated in a DBMS

To evaluate the performance of SSI on full-fledged DBMSs, SSI is implemented on two DBMSs. One is from the research community, PostgreSQL, and the other is a commercial DBMS.

On each DBMS the performance of three indexing methods is evaluated:

SSI. DBMS implementation of SSI as explained in the embodiments implemented in a full-fledged DBMS without modifying the DBMS kernel.

Standard. The DBMS' standard data indexing component, where the objects are stored in a database table as described in the embodiments implemented in a full-fledged DBMS without modifying the DBMS kernel. But instead of creating a B+ tree index on the SSI keys, this method creates one B+ tree index on each bound of the object MBRs (i.e., one B+ tree for each MBR bound column of the database table). When a window query arrives (in the form of a SQL query like the one shown in the embodiments implemented in a full-fledged DBMS without modifying the DBMS kernel, but without the predicates on the SSI keys), the DMBS automatically chooses the proper B+ tree to evaluate the query.

R-tree. The DBMS' built-in spatial component (specifically, the R-tree).

PostgreSQL.

Figure 31:
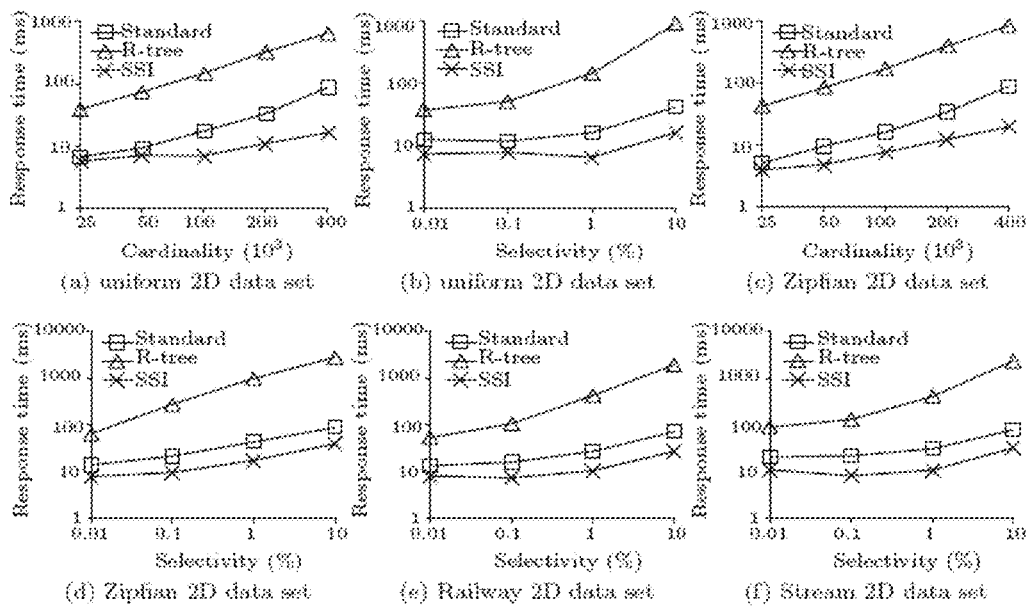
FIG. 31 illustrates window query performance of indexes in the PostgreSQL implementation according to an embodiment of the present invention.

As shown in FIG. 31, when implemented on PostgreSQL, SSI outperforms the R-tree and PostgreSQL's standard data indexing component constantly. Compared with PostgreSQL's standard data indexing component, SSI is more than twice as fast on average (please note the logarithmic scale). The response time of SSI grows much slower as the increase of data set cardinality. It can be observed that the R-tree in PostgreSQL shows even worse performance than the standard data indexing component does. When looking into the query processing procedure of PostgreSQL when the R-tree is used for indexing, it can be found that the query optimizer is more likely to use a sequential scan to process window queries rather than using the R-tree index. A possible reason is that PostgreSQL's query optimizer has not got accurate estimation on the cost of using the R-tree index and thus, it is being conservative in most cases and uses sequential scans instead. It is found that this is actually a common phenomenon observed by many users in the PostgreSQL community.

A DBMS.

Figure 32:
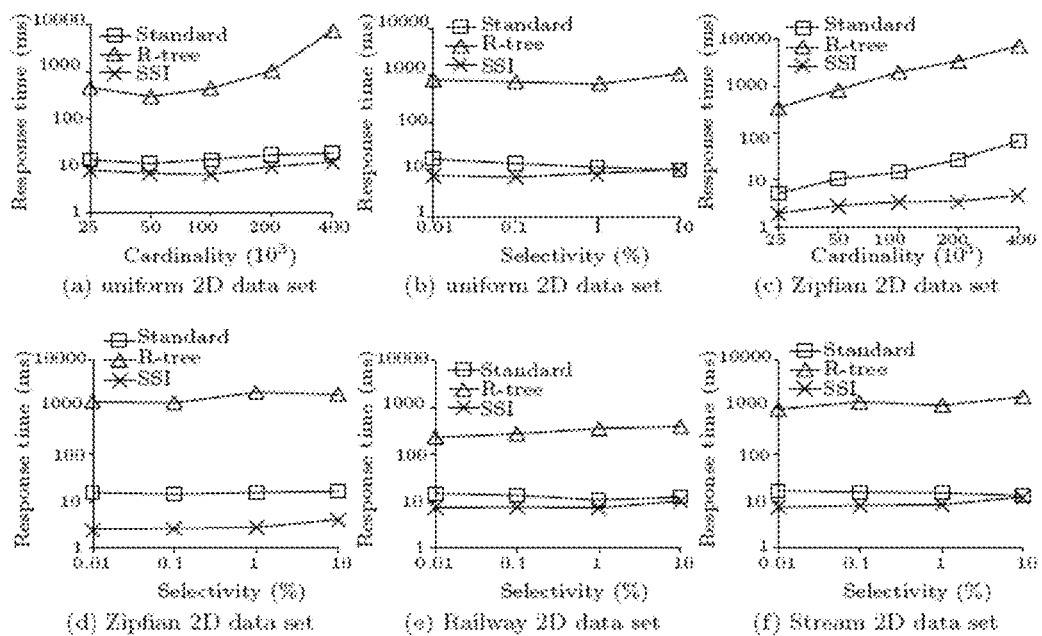
FIG. 32 illustrates window query performance of indexes of a DBMS implementation according to an embodiment of the present invention.

Here, an R-tree in the commercial DBMS is created to index the spatial objects following the official documentation. As FIG. 32 shows, SSI again outperforms the R-tree index as well as the standard index used in the commercial DBMS when the data set cardinality and the query selectivity are varied. It can be observed that when the data are more skewed, the advantage of SSI is more significant (by an order of magnitude as shown in (c) and (d) of FIG. 32). This is because of the cumulative mapping used to generate an approximately uniform distribution to reduce the false positives in the filtering stage of query processing.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method for determining spatial data objects of a data space, implemented in a computing system serving as a Database Management system (DBMS), wherein each of the spatial data objects is an N-dimensional data object with N being an integer greater than or equal to 2, the method comprising:
   determining, by a processor of the computing system, a cumulative distribution of sizes of the spatial data objects;
   separating, by the processor of the computing system, the cumulative distribution into a plurality of separations sets according to a plurality of separating manners, wherein each separation set corresponds to one separating manner;
   computing a cost model for each of the plurality of separation sets;
   using the cost model to select a separation set that has the lowest total cost among the plurality of separation sets;
   associating, by the processor of the computing system, each spatial data object with one of a plurality of separations among the selected separation set according to a size of the respective spatial data object, wherein the size of each spatial data object is the maximum extent of the respective spatial data object;
   mapping, by the processor of the computing system, each spatial data object to an index key based on the separation with which the spatial data object is associated, wherein each spatial data object is mapped to the index key by using a space-filling curve value, the index key representing a block within the data space that intersects the spatial data object; and
   determining, by the processor of the computing system, spatial data objects in the data space upon receiving a query on the spatial data objects.

2. The method as claimed in claim 1, further comprising:
   obtaining, by the processor of the computing system, at least one spatial data object; and
   storing, by the processor of the computing system, at least one index key.

3. The method as claimed in claim 1, wherein determining, by the processor of the computing system, a cumulative distribution of spatial data object sizes comprises:
   sampling spatial data objects of the data space;
   determining a size of each sampled spatial data object; and
   determining a cumulative distribution of the sampled spatial data object sizes.

4. The method as claimed in claim 1, further comprising:
   mapping, by the processor of the computing system, a position of each spatial data object to one of a uniformly distributed plurality of mapped positions, and
   wherein each spatial data object is mapped to an index key based on the separation with which the spatial data object is associated and the mapped position of the spatial data object.

5. The method as claimed in claim 4, further comprising:
   sampling, by the processor of the computing system, spatial data objects of the data space;
   determining, by the processor of the computing system, a position of each sampled spatial data object;
   determining, by the processor of the computing system, a cumulative distribution of the sampled spatial data object positions; and
   determining, by the processor of the computing system, a cumulative mapping function based on the cumulative distribution of the sampled spatial data object positions for mapping spatial data object positions to uniformly distributed mapped positions.

6. A method of performing an operation on an index of spatial data objects associated with a plurality of separations, implemented in a computing system serving as a Database Management system (DBMS), wherein each of the spatial data objects is an N-dimensional data object with N being an integer greater than or equal to 2, the method comprising:
   receiving, by a processor of the computing system, a query on spatial data objects;
   determining, by the processor of the computing system, adjusted queries to be performed on spatial data objects associated with each separation based on a size characteristic of the respective separation and the received query, wherein the size characteristic of each separation is the maximum size among sizes of spatial data objects in the respective separation, wherein each of the sizes of the spatial data objects is the maximum extent of the respective spatial data object;
   performing, by the processor of the computing system, an adjusted query for each separation, wherein a list of index keys is determined by adding index key pairs, by the processor of the computing system, the first key of an index key pair representing an entry point to a window of the adjusted query and the second key of the index key pair representing the next exit point after the entry point to the window of the adjusted query; and
   determining, by the processor of the computing system, spatial data objects that satisfy the received query in the data space;
   wherein the plurality of separations are obtained by: determining a cumulative distribution of sizes of the spatial data objects; separating the cumulative distribution into a plurality of separations sets according to a plurality of separating manners, wherein each separation set corresponds to one separating manner; computing a cost model for each of the plurality of separation sets; and using the cost model to select a separation set that has the lowest total cost among the plurality of separation sets.

7. The method as claimed in claim 6, wherein determining, by the processor of the computing system, adjusted queries to be performed for spatial data objects associated with each separation based on a size characteristic of the respective separation and the received query comprises forming a window query having a rectangular window.

8. The method as claimed in claim 7, wherein the rectangular window of an adjusted query is formed by extending the rectangular window of the received query.

9. The method as claimed in claim 8, wherein an extension is equivalent to half the maximum size of a spatial data object associated with the respective separation.

10. The method as claimed in claim 7, wherein determining, by the processor of the computing system, adjusted queries to be performed for spatial data objects associated with each separation based on a size characteristic of the respective separation and the received query further comprises mapping at least one position of the rectangular window of the adjusted query to at least one of a uniformly distributed plurality of mapped positions.

11. The method as claimed in claim 10, wherein each corner position of the rectangular window of an adjusted query is mapped to a mapped position.

12. The method as claimed in claim 7, wherein performing, by the processor of the computing system, an adjusted query for each separation comprises determining a list of index key ranges comprising index keys representing spatial data objects that intersect the window of the adjusted query.

13. The method as claimed in claim 12, wherein the list of index keys is determined by adding index keys of a region of the separation to the list of index keys by the processor of the computing system.

14. The method as claimed in claim 13, wherein the index keys of the region is added to the list of index keys when the window of the adjusted query covers the region.

15. The method as claimed in claim 12, wherein the list of index keys is determined by sub-dividing, by the processor of the computing system, a region into a plurality of sub-regions; and adding, by the processor of the computing system, index keys of each sub-region that the window of the adjusted query covers.

\* \* \* \* \*